(12) United States Patent
Purpus et al.

(10) Patent No.: US 9,020,830 B2
(45) Date of Patent: Apr. 28, 2015

(54) HIERARCHY BASED DEPENDENT OBJECT RELATIONSHIPS

(75) Inventors: Eric Scott Purpus, Bellevue, WA (US); Stephen David Luke Atwell, Bellevue, WA (US)

(73) Assignee: Apptio, Inc., Bellevue, WA (US)

( * ) Notice: Subject to any disclaimer, the term of this patent is extended or adjusted under 35 U.S.C. 154(b) by 53 days.

(21) Appl. No.: 13/324,253

(22) Filed: Dec. 13, 2011

(65) Prior Publication Data
US 2012/0233217 A1    Sep. 13, 2012

Related U.S. Application Data

(60) Provisional application No. 61/450,539, filed on Mar. 8, 2011.

(51) Int. Cl.
*G06F 17/30* (2006.01)
*G06Q 10/06* (2012.01)

(52) U.S. Cl.
CPC .......... *G06Q 10/06* (2013.01); *G06F 17/30607* (2013.01); *Y10S 707/955* (2013.01)

(58) Field of Classification Search
CPC ............................ G06Q 10/06; G06F 7/30607
USPC .................................. 705/7.12; 707/792, 955
See application file for complete search history.

(56) References Cited

U.S. PATENT DOCUMENTS

| 5,249,120 | A |   | 9/1993  | Foley |
|-----------|---|---|---------|-------|
| 5,721,919 | A |   | 2/1998  | Morel et al. |
| 5,799,286 | A |   | 8/1998  | Morgan et al. |
| 5,970,476 | A | * | 10/1999 | Fahey .............................. 705/28 |
| 5,991,741 | A |   | 11/1999 | Speakman et al. |
| 6,014,640 | A |   | 1/2000  | Bent |
| 6,032,123 | A | * | 2/2000  | Jameson ...................... 705/7.22 |
| 6,047,290 | A | * | 4/2000  | Kennedy et al. ...................... 1/1 |
| 6,208,993 | B1|   | 3/2001  | Shadmon |
| 6,249,769 | B1|   | 6/2001  | Ruffin et al. |
| 6,253,192 | B1|   | 6/2001  | Corlett et al. |

(Continued)

OTHER PUBLICATIONS

Henriet, Dominique, and Herve Moulin. "Traffic-based cost allocation in a network." The Rand Journal of Economics (1996): 332-345.*

(Continued)

*Primary Examiner* — Neveen Abel Jalil
*Assistant Examiner* — Kristofer Biskeborn
(74) *Attorney, Agent, or Firm* — John W. Branch; Lowe Graham Jones PLLC

(57) ABSTRACT

Embodiments are directed towards employing a plurality of object relationships to dynamically generate a hierarchical structure of dependent object relationships ("HSDOR"). Each object relationship may include a plurality of information, including, but not limited to, a consumer object, a provider object, a one or more direct values, a quantity of units consumed by the consumer object, or the like. Dependencies between the plurality of object relationships may be utilized to dynamically generate an HSDOR. In some embodiments, the HSDOR may be modified by resolving detected circularity relationships within the HSDOR and/or dynamically modifying object relationship dependencies affected by a new and/or modified object relationship. In some embodiments, the HSDOR may be utilized to iteratively determine a total value of an object as a function of total loaded values of object relationships from which the object depends.

17 Claims, 16 Drawing Sheets

(56) References Cited

U.S. PATENT DOCUMENTS

| | | |
|---|---|---|
| 6,308,166 B1* | 10/2001 | Breuker et al. ............... 705/400 |
| 6,321,207 B1 | 11/2001 | Ye |
| 6,330,552 B1 | 12/2001 | Farrar et al. |
| 6,507,825 B2 | 1/2003 | Suh |
| 6,578,005 B1 | 6/2003 | Lesaint et al. |
| 6,839,719 B2 | 1/2005 | Wallace |
| 6,877,034 B1 | 4/2005 | Machin et al. |
| 6,882,630 B1 | 4/2005 | Seaman |
| 6,983,321 B2 | 1/2006 | Trinon et al. |
| 7,050,997 B1 | 5/2006 | Wood, Jr. |
| 7,149,700 B1 | 12/2006 | Munoz et al. |
| 7,177,850 B2 | 2/2007 | Argenton et al. |
| 7,263,527 B1 | 8/2007 | Malcom |
| 7,590,937 B2 | 9/2009 | Jacobus et al. |
| 7,634,431 B2 | 12/2009 | Stratton |
| 7,725,343 B2 | 5/2010 | Johanson et al. |
| 7,742,961 B2 | 6/2010 | Aaron et al. |
| 7,752,077 B2 | 7/2010 | Holden et al. |
| 7,774,458 B2 | 8/2010 | Trinon et al. |
| 7,783,759 B2 | 8/2010 | Eilam et al. |
| 7,813,948 B2 | 10/2010 | Ratzloff |
| 7,877,742 B2 | 1/2011 | Duale et al. |
| 7,899,235 B1 | 3/2011 | Williams et al. |
| 7,930,396 B2 | 4/2011 | Trinon et al. |
| 7,933,861 B2 | 4/2011 | Zadorozhny |
| 7,966,235 B1 | 6/2011 | Capelli et al. |
| 8,024,241 B2 | 9/2011 | Bailey et al. |
| 8,175,863 B1 | 5/2012 | Ostermeyer et al. |
| 8,200,518 B2 | 6/2012 | Bailey et al. |
| 8,209,218 B1 | 6/2012 | Basu et al. |
| 8,370,243 B1 | 2/2013 | Cernyar |
| 8,423,428 B2 | 4/2013 | Grendel et al. |
| 8,484,355 B1 | 7/2013 | Lochhead et al. |
| 2002/0002557 A1 | 1/2002 | Straube et al. |
| 2002/0016752 A1 | 2/2002 | Suh |
| 2002/0069102 A1 | 6/2002 | Vellante et al. |
| 2002/0123945 A1 | 9/2002 | Booth et al. |
| 2002/0145040 A1 | 10/2002 | Grabski, III |
| 2002/0156710 A1 | 10/2002 | Ryder |
| 2003/0083888 A1* | 5/2003 | Argenton et al. ............... 705/1 |
| 2003/0139960 A1 | 7/2003 | Nishikawa et al. |
| 2003/0139986 A1 | 7/2003 | Roberts, Jr. |
| 2003/0158766 A1 | 8/2003 | Mital et al. |
| 2003/0172368 A1 | 9/2003 | Alumbaugh et al. |
| 2003/0236721 A1* | 12/2003 | Plumer et al. ............... 705/30 |
| 2004/0059611 A1 | 3/2004 | Kananghinis et al. |
| 2004/0093344 A1 | 5/2004 | Berger et al. |
| 2004/0111509 A1 | 6/2004 | Eilam et al. |
| 2004/0186762 A1 | 9/2004 | Beaven et al. |
| 2004/0243438 A1 | 12/2004 | Mintz |
| 2005/0004856 A1 | 1/2005 | Brose et al. |
| 2005/0060317 A1 | 3/2005 | Lott et al. |
| 2005/0120032 A1* | 6/2005 | Liebich et al. ............... 707/100 |
| 2006/0080264 A1* | 4/2006 | Zhang et al. ............... 705/400 |
| 2006/0085465 A1 | 4/2006 | Nori et al. |
| 2006/0106658 A1* | 5/2006 | Johanson et al. ............... 705/7 |
| 2006/0161879 A1 | 7/2006 | Lubrecht et al. |
| 2006/0167703 A1 | 7/2006 | Yakov |
| 2006/0178960 A1 | 8/2006 | Lepman |
| 2006/0179012 A1 | 8/2006 | Jacobs |
| 2006/0190497 A1 | 8/2006 | Inturi et al. |
| 2006/0200477 A1 | 9/2006 | Barrenechea |
| 2006/0212334 A1 | 9/2006 | Jackson |
| 2006/0224946 A1 | 10/2006 | Barrett et al. |
| 2006/0228654 A1 | 10/2006 | Sanjar et al. |
| 2006/0282429 A1 | 12/2006 | Hernandez-Sherrington et al. |
| 2007/0113289 A1 | 5/2007 | Blumenau |
| 2007/0124162 A1* | 5/2007 | Mekyska ............... 705/1 |
| 2007/0198982 A1 | 8/2007 | Bolan et al. |
| 2007/0214413 A1 | 9/2007 | Boeckenhauer |
| 2007/0226090 A1* | 9/2007 | Stratton ............... 705/30 |
| 2007/0260532 A1 | 11/2007 | Blake, III |
| 2007/0276755 A1* | 11/2007 | Rapp ............... 705/50 |
| 2007/0282626 A1* | 12/2007 | Zhang et al. ............... 705/1 |
| 2008/0033774 A1 | 2/2008 | Kimbrel et al. |
| 2008/0065435 A1 | 3/2008 | Ratzloff |
| 2008/0201269 A1 | 8/2008 | Hollins et al. |
| 2008/0295096 A1 | 11/2008 | Beaty et al. |
| 2008/0312979 A1 | 12/2008 | Lee et al. |
| 2009/0012986 A1 | 1/2009 | Arazi et al. |
| 2009/0018880 A1* | 1/2009 | Bailey et al. ............... 705/7 |
| 2009/0100017 A1 | 4/2009 | Graves et al. |
| 2009/0100406 A1 | 4/2009 | Greenfield et al. |
| 2009/0150396 A1 | 6/2009 | Elisha et al. |
| 2009/0198535 A1 | 8/2009 | Brown et al. |
| 2009/0216580 A1* | 8/2009 | Bailey et al. ............... 705/7 |
| 2009/0300173 A1 | 12/2009 | Bakman et al. |
| 2009/0319316 A1 | 12/2009 | Westerfeld et al. |
| 2010/0005014 A1 | 1/2010 | Castle et al. |
| 2010/0005173 A1 | 1/2010 | Baskaran et al. |
| 2010/0042455 A1* | 2/2010 | Liu et al. ............... 705/8 |
| 2010/0082380 A1* | 4/2010 | Merrifield et al. ............... 705/7 |
| 2010/0125473 A1 | 5/2010 | Tung et al. |
| 2010/0169477 A1 | 7/2010 | Stienhans et al. |
| 2010/0211667 A1 | 8/2010 | O'Connell, Jr. |
| 2010/0250419 A1 | 9/2010 | Ariff et al. |
| 2010/0250421 A1 | 9/2010 | Ariff et al. |
| 2010/0250642 A1 | 9/2010 | Yellin et al. |
| 2010/0293163 A1 | 11/2010 | McLachlan |
| 2010/0299233 A1 | 11/2010 | Licardi et al. |
| 2010/0306382 A1 | 12/2010 | Cardosa et al. |
| 2010/0325606 A1 | 12/2010 | Sundararajan et al. |
| 2010/0332262 A1 | 12/2010 | Horvitz et al. |
| 2010/0333109 A1* | 12/2010 | Milnor ............... 718/106 |
| 2011/0016214 A1 | 1/2011 | Jackson |
| 2011/0016448 A1 | 1/2011 | Bauder et al. |
| 2011/0022861 A1 | 1/2011 | Agneeswaran et al. |
| 2011/0106691 A1 | 5/2011 | Clark et al. |
| 2011/0167034 A1* | 7/2011 | Knight et al. ............... 707/602 |
| 2011/0225277 A1 | 9/2011 | Freimuth et al. |
| 2012/0023170 A1 | 1/2012 | Matignon et al. |
| 2012/0066020 A1 | 3/2012 | Moon et al. |
| 2012/0131591 A1 | 5/2012 | Moorthi et al. |
| 2012/0150736 A1 | 6/2012 | Dickerson et al. |
| 2012/0232947 A1 | 9/2012 | McLachlan et al. |
| 2012/0233217 A1 | 9/2012 | Purpus et al. |
| 2012/0233547 A1 | 9/2012 | McLachlan |
| 2013/0041819 A1 | 2/2013 | Khasho |
| 2013/0060595 A1 | 3/2013 | Bailey |
| 2013/0103654 A1 | 4/2013 | McLachlan et al. |
| 2013/0138470 A1 | 5/2013 | Goyal et al. |
| 2013/0201193 A1 | 8/2013 | McLachlan et al. |
| 2013/0282537 A1 | 10/2013 | Snider |

OTHER PUBLICATIONS

Rudnick, Hugh, Rodrigo Palma, and José E. Fernández. "Marginal pricing and supplement cost allocation in transmission open access." Power Systems, IEEE Transactions on 10.2 (1995): 1125-1132.*

Official Communication for U.S. Appl. No. 12/467,120 mailed Oct. 4, 2011.

International Search Report and Written Opinion for International Patent Application No. PCT/US2010/035021 mailed Jul. 14, 2010.

International Preliminary Report on Patentability for International Patent Application No. PCT/US2010/035021 mailed Nov. 24, 2011.

"Program Evaluation and Review Technique," Wikipedia, the free encyclopedia, accessed Mar. 13, 2012, 10 pages http://en.wikipedia.org/wiki/Program_Evaluation_and_Review_Technique—last modified Mar. 12, 2012.

"Project management," Wikipedia, the free encyclopedia, accessed Mar. 13, 2012, 14 pages http://en.wikipedia.org/wiki/Project_management—last modified Mar. 7, 2012.

International Search Report and Written Opinion for International Patent Application No. PCT/US2012/028353 mailed Oct. 31, 2012.

International Search Report and Written Opinion for International Patent Application No. PCT/US2012/028378 mailed on Sep. 12, 2012.

Official Communication for U.S. Appl. No. 12/467,120 mailed Jun. 20, 2012.

Official Communication for U.S. Appl. No. 12/467,120 mailed Aug. 29, 2012.

(56) References Cited

OTHER PUBLICATIONS

Official Communication in U.S. Appl. No. 13/452,628, mailed Apr. 22, 2013.
Extended European Search Report in EP Application No. 13151967.0-1955, mailed Apr. 19, 2013.
Official Communication issued in U.S. Appl. No. 12/467,120 mailed Mar. 26, 2013.
"Notice from the European Patent Office dated Oct. 1, 2007 concerning business methods," Official Journal EPO, Nov. 2007, pp. 592-593.
"Activity Based Costing is the best allocation methodology," APPTIO, Community for Technology Business Management, Mar. 16, 2010, 2 pages.
"Amazon Elastic Computer Cloud (Amazon EC2)", archive.org, Oct. 21, 2011, 9 pages http://web.archive.org/web/20111029130914/http://aws.amazon.com/ec2/#pricing.
"Apptio Extends Leadership in Cloud Business Management with Launch of Apptio Cloud Express," Apptio, Dec. 12, 2012, 2 pages http://www.apptio.com/news/apptio-extends-leadership-cloud-business-management-launch-apptio-cloud-express#.Ukm4r8X7Lco.
"Apptio Optimizes Enterprise IT Costs Utilizing Amazon Web Services Cloud Computing," Apptio, Apr. 7, 2009, 2 pages http://www.apptio.com/news/apptio-optimizes-enterprise-it-costs-utilizing-amazon-web-services-cloud-computing#.Ukm5XsX7Lco.
"Automating Cost Transparency," Apptio, 2008, 15 pages htto://www.cio.com/documents/whitepapers/AutomatedCostTransparency.pdf.
"Cloud Computing and Sustainability: The Environmental Benefits of Moving to the Cloud," Accenture, archive.org, Aug. 31, 2011, 17 pages http://web.archive.org/web/20110813022626/http://www.accenture.com/SiteCollectionDocuments/PDF/Accenture_Sustainability_Cloud_Computing_TheEnvironmentalBenefitsofMovingtotheCloud.pdf.
"IT Cost Transparency and Apptio," Dec. 4, 2008, 2 pages http://web.archive.org/web/20081204012158/http://www.apptio.com/solutions.
"Visualization for Production Management: Treemap and Fisheye Table Browser," Open-Video Organization webpages, 2001, 2 pages http://www.open-video.org/details.php?videoid=4547.
Busch, J., "Six Strategies for IT Cost Allocation," Spend Matters, Jan. 5, 2011, 3 pages http://spendmatters.com/2011/01/05/six-strategies-for-it-cost-allocation/.
Morgan, T. P., "Apptio puffs up freebie cost control freak for public clouds," The Register, Dec. 12, 2012, 2 pages http://www.theregister.co.uk/2012/12/12/apptio_cloud_express.
Ricknäs, M., "Apptio unveils tool to keep track of cloud costs," ComputerWorld, Dec. 12, 2012, 1 page http://www.computerworld.com/s/article/9234630/Apptio_unveils_tool_to_keep_track_of_cloud_costs.
Talbot, C., "Apptio Cloud Express Provides Free Usage Tracking Service," talkincloud.com, Dec. 12, 2012, 4 pages http://talkincloud.com/cloud-computing-management/apptio-cloud-express-provides-free-usage-tracking-service.
Vizard, M., "Free Service from Apptio Tracks Cloud Service Provider Pricing," IT Business Edge, Dec. 12, 2012, 6 pages http://www.itbusinessedge.com/blogs/it-unmasked/free-service-from-apptio-tracks-cloud-service-provider-pricing.html.
International Preliminary Report on Patentability for International Patent Application No. PCT/US2012/028353 mailed Sep. 19, 2013.
International Preliminary Report on Patentability for International Patent Application No. PCT/US2012/028378 mailed Sep. 19, 2013.
Official Communication for U.S. Appl. No. 12/467,120 mailed Oct. 23, 2013.
Official Communication for U.S. Appl. No. 13/415,797 mailed Oct. 3, 2013.
Official Communication for U.S. Appl. No. 13/452,628 mailed Nov. 18, 2013.
Official Communication for U.S. Appl. No. 13/675,837 mailed Oct. 10, 2013.
Official Communication for U.S. Appl. No. 13/837,815 mailed Oct. 23, 2013.
Official Communication for U.S. Appl. No. 13/917,478 mailed Nov. 7, 2013.
Official Communication for U.S. Appl. No. 13/917,503 mailed Oct. 10, 2013.
Official Communication for U.S. Appl. No. 13/935,147 mailed Oct. 22, 2013.
Official Communication for U.S. Appl. No. 14/033,130 mailed Dec. 16, 2013.
Official Communication for U.S. Appl. No. 13/675,837 mailed Jan. 31, 2014.
Official Communication for U.S. Appl. No. 13/917,503 mailed Jan. 31, 2014.
Ganesan Harish, Auto Scaling using AWS, Amazon Web Services AWS (selected slides), Apr. 20, 2011 http://www.slideshare.net/harishganesan/auto-scaling-using-amazon-web-services-aws.
Robinson Glen, Cloud Economics—Cost Optimization (selected slides), Amazon Web Services AWS, Slideshare, Feb. 28, 2012 http://www.slideshare.net/AmazonWebServices/whats-new-with-aws-london.
Skilton et al, Building Return on Investment from Cloud Computing, The open Group Whitepaper, mladina webpages, Apr. 2010 http://www.mladina.si/media/objave/dokumenti/2010/5/31/31_5_2010_open_group_building_return-on-investment-from-cloud-computing.pdf.
Ward Miles, Optimizing for Cost in the Cloud (selection), AWS Summit, Slideshare Apr. 2012 http://www.slideshare.net/AmazonWebServices/optimizing-your-infrastructure-costs-on-aws.
Amazon Reserved Instances, Amazon Web Services, archives org, Jan. 14, 2013 http://web.archive.org/web/2012011453849/http://aws.amazon.com/rds/reserved-instances/?
Cost Optimisation with Amazon Web Services, extracted slides, Slideshare Jan. 30, 2012 http://www.slideshare.net/AmazonWebServices/cost-optimisation-with-amazon-web-services?from_search=1.
Deciding an Approach to the cloud AWS Reserved Instances, Cloudyn webpages, Feb. 28, 2012 https://www.cloudyn.com/blog/deciding-an-approach-to-the-cloud-aws-reserved-aws.
Extended European Search Report in EP Application No. 14159413.5 mailed Jul. 4, 2014.
Office Communication for U.S. Appl. No. 13/452,628 mailed Mar. 13, 2014.
Office Communication for U.S. Appl. No. 14/180,308 mailed Apr. 8, 2014.
Office Communication for U.S. Appl. No. 14/180,308 mailed Sep. 2, 2014.
Office Communication for U.S. Appl. No. 14/033,130 mailed on Aug. 5, 2014.
Office Communication for U.S. Appl. No. 14/033,130 mailed on May 27, 2014.
Office Communication for U.S. Appl. No. 13/935,147 mailed on Jun. 16, 2014.
Office Communication for U.S. Appl. No. 13/935,147 mailed on Apr. 11, 2014.
Office Communication for U.S. Appl. No. 13/675,837 mailed on Jan. 31, 2014.
SAS Activity-Based Management, 2010, Fact Sheet, 4 pages.
Office Communication for U.S. Appl. No. 13/415,797 mailed on Apr. 9, 2014.
Office Communication for U.S. Appl. No. 13/917,503 mailed Apr. 3, 2014.
Office Communication for U.S. Appl. No. 14/180,308 mailed Jan. 30, 2015.
Office Communication for U.S. Appl. No. 13/365,150 mailed on Dec. 3, 2014.
Office Communication for U.S. Appl. No. 13/452,628 mailed on Oct. 1, 2014.
Office Communication for U.S. Appl. No. 13/415,797 mailed on Jan. 12, 2015.
Office Communication for U.S. Appl. No. 13/837,815 mailed on Apr. 7, 2014.
Office Communication for U.S. Appl. No. 13/675,837 mailed on Apr. 2, 2014.
Office Communication for U.S. Appl. No. 13/837,815 mailed Sep. 25, 2014.

* cited by examiner

|  | Object_1 | Object_2 | Quantity | Direct Demand (units) (Object 1 provides Object 2) | Direct Price ($) (Object 2 provides to Object 1) |
|---|---|---|---|---|---|
| | Service-39 | Service-58 | 0.2 | 0 | 3 |
| | Service-50 | Service-39 | 1 | 0 | 10 |
| | Service-40 | Service-60 | 2 | 0 | 1.5 |
| | Service-40 | Service-58 | 0.5 | 0 | 3 |
| | Service-49 | Service-40 | 1 | 0 | 3 |
| | Business Unit 1 | Service-40 | 5 | 1 | 3 |
| | Business Unit 1 | Service-60 | 5 | 2 | 4 |

| Consumer | Total Price from Sub Objects |
|---|---|
| Service-39 | 0.6 |
| Service-40 | 4.5 |
| Service-49 | 7.5 |
| Service-50 | 10.6 |
| Service-60 | 0 |
| Business Unit 1 | 57.5 |

1204 — Consumer column
1206 — Total Price from Sub Objects column
1208 — brace around Service-40 through Service-50 rows
Objects (1202) — brace around all rows

FIG. 12

View Planned Price List

View the planned price list of the services in the domain.

» Planned Price List

| Service ID ▲ | Service Name | Service Offering | Planned Price | Total Setup Fee | Shutdown Fee | Price Set | Avg Price Last Year | Change |
|---|---|---|---|---|---|---|---|---|
| Application Servers | | | | | | | | |
| SID-0000041 | Application Server | Small Weblogic | $.00 / Month | $.00 | $.00 | No | $4 / instance | ⬦ |
| SID-0000042 | Application Server | Small Websphere | / Month | | | No | $5 / instance | ⬦ |
| Collaboration | | | | | | | | |
| SID-0000039 | Email | Standard Email | $15.13 / Month | $.20 | $.10 | Yes | $9.4 / account | ⬦ |
| SID-0000040 | Email | Large Email | $.63 / Month | $1.00 | $.50 | Yes | $8 / account | ⬦ |
| Employee | | | | | | | | |
| SID-0000048 | Employee | Contract Employee | / Month | | | No | $12.23 / people | ⬦ |
| SID-0000049 | Employee | Remote Employee | / Month | | | No | $25 / people | ⬦ |
| SID-0000050 | Employee | Standard Employee | $205.13 / Month | $31.70 | $18.72 | Yes | $30 / people | ⬦ |
| Equipment | | | | | | | | |
| SID-0000051 | Computer | Intel Atom D510 | / Month | | | No | $39 / computer | ⬦ |
| SID-0000052 | Desktop Phone with Caller ID | POLYCOM Phone | $95.00 / Month | $15.75 | $9.31 | No | - | ⬦ |
| SID-0000053 | Computer | DELL Latitude E6500 | $2.50 / Month | $4.00 | $2.00 | No | $30 / computer | ⬦ |
| SID-0000054 | Headset | VOIP Phone headset | / Month | | | No | - | |

HIERARCHY BASED DEPENDENT OBJECT RELATIONSHIPS

CROSS-REFERENCE TO RELATED APPLICATIONS

This application claims the benefit of U.S. Provisional Application Ser. No. 61/450,539 entitled "METHODS AND SYSTEMS FOR MEDIATING MANAGEMENT OF BUSINESS PROCESSES AND ASSETS AND FOR RAPID DEVELOPMENT OF APPLICATIONS," filed on Mar. 8, 2011, the benefit of the earlier filing date of which is hereby claimed under 35 U.S.C. §119(e), and which is further incorporated by reference.

TECHNICAL FIELD

The present invention relates generally to data management systems and, more particularly, but not exclusively to dynamically generating a hierarchical structure of dependent object relationships based on a plurality of object relationships.

BACKGROUND

Today businesses typically consist of multiple interrelated services, where one service depends on another service that depends on yet another service, and so forth. A goal of some businesses may be to track the cost of each service, including sub-services. One traditional method of tracking services may be to organize each service based on dependency levels. For example, services for one business may be organized into three levels: level 1 (email), level 2 (server), and level 3 (memory and processors). However, if an additional service is added, such as between email and server, then the levels may need to be reorganized to include a new level and to renumber existing levels. This reorganization can increase the difficulty in tracking and updating the cost of each service when services change. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 9 show one embodiment of a use case illustrating a list of object relationships for generating a hierarchical structure of dependent object relationships;

FIG. 12 shows one embodiment of a use case illustrating a list of objects and a related total value of each object based on determined total loaded values of associated object relationships, such as the total loaded values shown in FIG. 11A;

FIG. 14 shows one embodiment of a use case screenshot of a portion of a graphical user interface for displaying object total values; and FIG. 15 shows one embodiment of a use case screenshot of a portion of a graphical user interface that facilitates the definition of a propagation rule.

DETAILED DESCRIPTION

Figure 1:
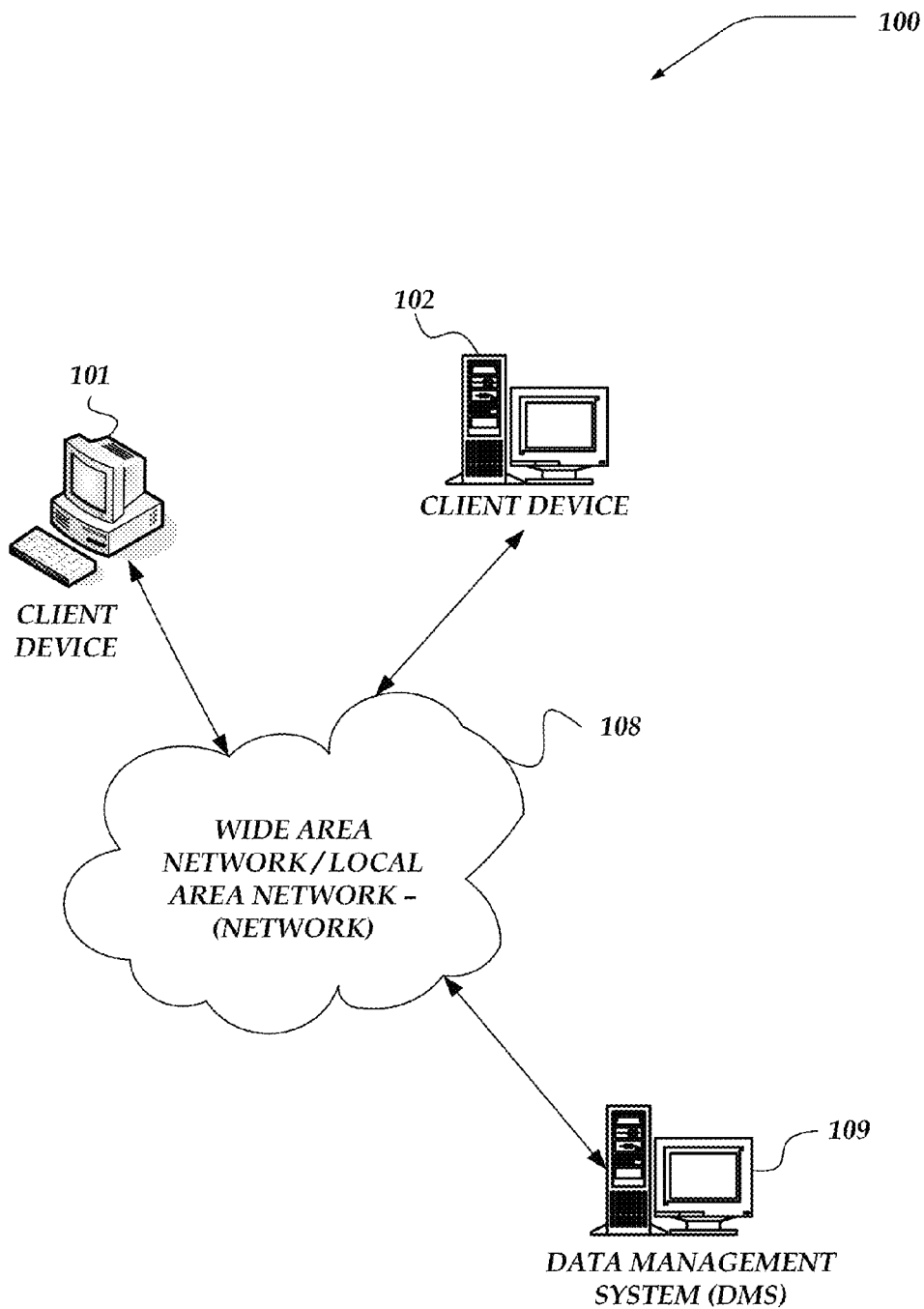
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "provider" refers to a person, entity, service, activity, asset, and/or a good from which another person, entity, service, activity, asset, and/or a good depend.

As used herein, the term "consumer" refers to a person, entity, service, activity, asset, and/or a good that is dependent on, consumes, or uses another person, entity, service, activity, asset, and/or a good.

As used herein, the term "object" refers to a provider and/or consumer. For example, an object may refer to, but is not limited to, assets, equipment (such as, computers, servers, chairs, desks, or the like), a business unit and/or entity, a project, an employee assignment, intangible items such as intellectual property, or the like.

As used herein, the phrase "object relationship" refers to a link between two objects where a first object (a consumer object) is dependent on a second object (a provider object), such that a direct value exists between the first object and the second object. As used herein, the phrase "direct value" refers to a relative value per unit of a provider object consumed by a consumer object of an object relationship. Direct value may include, but is not limited to money, resources, costs, units delivered, demand, or the like. In some embodiments, an object relationship may include a plurality of direct values associated with the object relationship, such as, but not limited to, fees, costs, dollars, taxes, budgets, demand, units delivered, planned expenses, actual expenses, on-time charges, planned one-time charges, planned usage, actual usage, or the like. In other embodiments, an object relationship may be a bidirectional object relationship, such that a first object provides a given direct value to a second object (i.e. the second object is dependent on the first object) and the second object provides a different given direct value to the first object (i.e. the first object is dependent on the second object).

As used herein, the phrase "total loaded value" refers to a relative worth of an object relationship including the relative worth of object relationships from which a respective object relationship depends. In one embodiment, the total loaded value may be calculated by combining a direct value of an object relationship to total loaded values of object relationships from which the object relationship depends with a number of units demanded, such as is described in more detail below. For example, assume Object 1 depends on one unit of Object 2 and has a direct value of 5, which may be identified as (1:2, 5). Next assume Object 2 depends on one unit of Object 3 and one unit of Object 4 and have direct values of 7 and 5, respectively (i.e. (2:3, 7) and (2:4, 5)). The total loaded value of the object relationship between Object 1 and 2 may equal 17 (i.e. (1:2, 5)+(2:3, 3)+(2:4, 5)), in this non-exhaustive example. However, other methods for calculating a total loaded value may also be employed.

As used herein, the phrase "destination/source pair" refers to destination object and a source object, where a path exists between the destination object and the source object. As used herein, the term "path" refers to one or more object relationships between the destination object and a source object, where the destination object is directly and/or indirectly dependent on the source object.

As used herein, the phrase "circularity relationship" refers to an object relationship where a consumer object of the object relationship directly depends on a provider object of the object relationship such that the provider object also directly or indirectly depends on the consumer object. A circularity relationship may include object relationships in a reverse directional flow.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards dynamically generating a hierarchical structure of dependent object relationships ("HSDOR") based on a plurality of object relationships. Each object relationship may include a plurality of information, including, but not limited to, a consumer object, a provider object, a one or more direct values, a quantity of units consumed by the consumer object, or the like. In other embodiments, an object relationship may be a bidirectional object relationship, where one object is a provider to another object for one direct value and a consumer of another direct value from the same object. In one embodiment, a bidirectional relationship may utilize a same, or different, sets of rules for how a first object relates to a second object, such as which object is a provider and which object is a consumer, or the like. In some embodiments, one bidirectional relationship may include a one or more sets of direct values, where each set may include one or more direct values.

The plurality of object relationships may be received from a user of a client device. The HSDOR may be dynamically generated from dependencies within the plurality of object relationships. Once generated, the HSDOR may be dynamically modified. In one embodiment, the HSDOR may be modified by removing any detected circularity relationships within the HSDOR. In another embodiment, the HSDOR may be modified by dynamically modifying object relationship dependencies affected by a new and/or modified object relationship.

The modified and/or unmodified HSDOR may be utilized to iteratively determine a total value for one or more of the plurality of objects as a function of a total loaded value of object relationships from which a respective object depends. In some embodiments, the total loaded value of a given object relationship may be iteratively determined by combining a quantity provided by a provider object of the given object relationship with direct value of the given object relationship and a total value of the provider object of the given object relationship. In one embodiment, iteratively determining a total value and/or total loaded values may include traversing edges on a graph representation of an HSDOR. In some other embodiments, the HSDOR may be utilized to generate an object hierarchy transform that includes a total quantity of a destination/source pair. In some embodiments, a total value of an object may be determined in real-time when an object relationship is added or modified. In other embodiments, the object hierarchy transform may be generated at a time delayed from the added or modified object relationship.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 108, client devices 101-102, and Data Management System ("DMS") 109.

One embodiment of client devices 101-102 is described in more detail below in conjunction with FIG. 2. Generally, however, client devices 101-102 may include virtually any computing device capable of communicating over a network to send and receive information, including object relationships, performing various online activities, offline actions, or the like. In one embodiment, one or more of client devices 101-102 may be configured to operate within a business or other entity to perform a variety of services for the business or other entity. For example, client devices 101-102 may be configured to operate as a web server, an accounting server, a production server, an inventory server, or the like. However, client devices 101-102 are not constrained to these services and may also be employed, for example, as an end-user computing node, in other embodiments. Further, it should be recognized that more or less client devices may be included within a system such as described herein, and embodiments are therefore not constrained by the number or type of client devices employed.

The set of such devices may include devices that typically connect using a wired or wireless communications medium such as personal computers, servers, multiprocessor systems, microprocessor-based or programmable consumer electronics, network PCs, or the like. In one embodiment, at least some of client devices 101-102 may operate over wired and/or wireless network, such as network 108. In some embodiments, client devices 101-102 may include virtually any portable computing device capable of receiving and sending a message over a network, such as a wireless network.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of the client device may employ the browser application to perform various activities over a network (online). However, another application may also be used to perform various online activities.

Client devices 101-102 also may include at least one other client application that is configured to receive and/or send data, including object relationships, between another computing device. The client application may include a capability to provide requests and/or receive data relating to a hierarchical structure of dependent object relationships ("HSDOR") generated from a plurality of object relationships. In some embodiments, the client application may employ processes such as described below in conjunction with FIGS. 4-8 to perform at least some of its actions.

The client application may further provide information that identifies itself, including a type, capability, name, and the like. In one embodiment, client devices 101-102 may uniquely identify themselves through any of a variety of mechanisms, including an IP address, or other device identifier. Such information may be provided in a network packet, or the like, sent between other client devices, DMS 109, or other computing devices.

Client devices 101-102 may further be configured to include a client application that enables an end-user to log into an end-user account that may be managed by another computing device, such as DMS 109, or the like. Such end-user account, in one non-limiting example, may be configured to enable the end-user to provide new and/or modify object relationships and/or obtain data about an object, such as a total value, or the like. However, participation in such online activities may also be performed without logging into the end-user account. In some embodiments, Client devices 101-102 may further include an application that is configured to employ processes such as described below in conjunction with FIGS. 4-8 to perform at least some of its actions.

Network 108 is configured to couple network devices with other computing devices, including, DMS 109 and client devices 101-102. Network 108 is enabled to employ any form of computer readable media for communicating information from one electronic device to another. Also, network 108 can include the Internet in addition to local area networks ("LANs"), wide area networks ("WANs"), direct connections, such as through a universal serial bus ("USB") port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In some embodiment, network 108 may be further configurable as a wireless network, which may further employ a plurality of access technologies including 2nd ("2G"), 3rd ("3G"), 4th ("4G") generation radio access for cellular systems, WLAN, Wireless Router ("WR") mesh, and the like. In one non-limiting example, network 107, when configured as a wireless network, may enable a radio connection through a radio network access such as Global System for Mobile communication ("GSM"), General Packet Radio Services ("GPRS"), Enhanced Data GSM Environment ("EDGE"), Wideband Code Division Multiple Access ("WCDMA"), and the like.

DMS 109 includes virtually any network device usable to operate as website servers to receive object relationship data from client devices 101-102 and to generate an HSDOR. DMS 109 may employ processes such as described below in conjunction with FIGS. 4-8 to perform at least some of its actions.

Devices that may operate as DMS 109 include various network devices, including, but not limited to personal computers, desktop computers, multiprocessor systems, microprocessor-based or programmable consumer electronics, network PCs, server devices, network appliances, and the like.

Although FIG. 1 illustrates DMS 109 as a single computing device, the invention is not so limited. For example, one or more functions of the DMS 109 may be distributed across one or more distinct network devices. Moreover, DMS 109 is not limited to a particular configuration. Thus, in one embodiment, DMS 109 may contain a plurality of network devices to generate an HSDOR. Similarly, in another embodiment, DMS 109 may contain a plurality of network devices that operate using a master/slave approach, where one of the plurality of network devices of DMS 109 operates to manage and/or otherwise coordinate operations of the other network devices. In other embodiments, the DMS 109 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
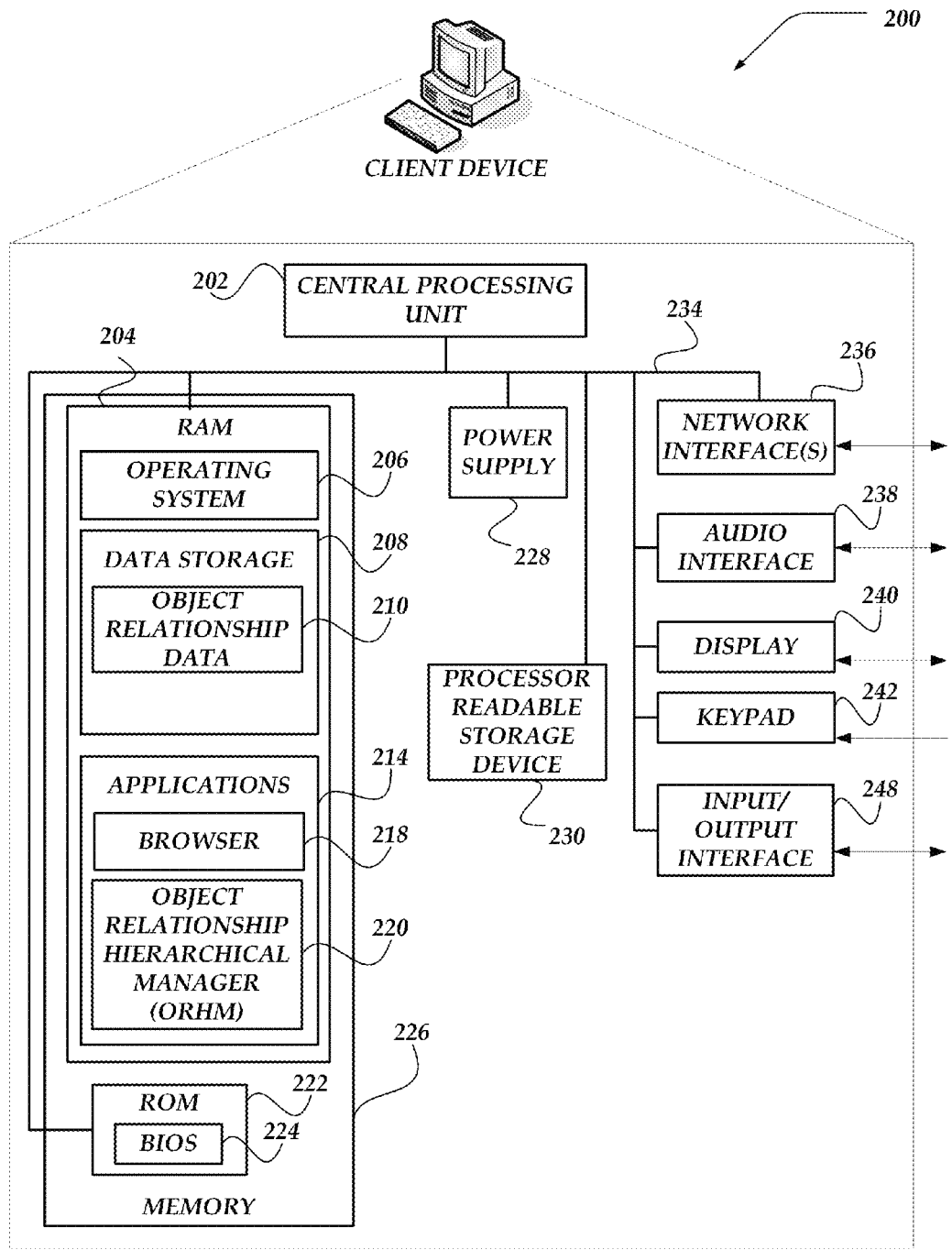
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-102 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, and an input/output interface 248. Power supply 228 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, global system for mobile communication ("GSM"), code division multiple access ("CDMA"), time division multiple access ("TDMA"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action. Display 240 may be a liquid crystal display ("LCD"), gas plasma, light emitting diode ("LED"), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. At least a portion of the information may also be stored on a disk drive or other computer-readable storage device (not shown) within client device 200. Further, as illustrated, data storage 208 may also store object relationship data 210. In some embodiments, object relationship data 210 may include data associated with object relationships, such as a consumer object, a provider object, direct value, a total loaded value, or the like. Such object relationship data 210 may also be stored within any of a variety of other computer-readable storage devices, including, but not limited to a hard drive, a portable storage device, or the like, such as illustrated by non-transitory computer-readable storage device 230. In yet other embodiments, data storage 208 may also store data associated with each object that is part of an object relationship.

Applications 214 may include computer executable instructions which, when executed by client device 200, transmit, receive, and/or otherwise process network data. Examples of application programs include, but are not limited to calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218 and Object Relationship Hierarchical Manger ("ORHM") 220.

Browser 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based languages may be employed. In one embodiment, browser 218 may enable a user of client device 200 to communicate with another network device, such as DMS 109 of FIG. 1. In one embodiment, browser 218 may enable a user to provide object relationship data and/or receive information about an HSDOR.

ORHM 220 is configured to employ dependencies from a plurality of object relationships to dynamically generate an HSDOR. ORHM 220 may, in some embodiments, modify the HSDOR. In one embodiment, ORHM 220 may modify the HSDOR by resolving any detected circularity relationships within the HSDOR. In another embodiment, ORHM 220 may dynamically modify the HSDOR by modifying object relationship dependencies affected by a new and/or modified object relationship. ORHM 220 may utilize the modified and/or unmodified HSDOR to determine a total value of given objects in the HSDOR as a function of total loaded values of one or more object relationships from which the given objects depend. In some other embodiments, ORHM 220 may employ the HSDOR to generate an object hierarchy transform. In any event, ORHM 220 may employ processes similar to those described below in conjunction with FIGS. 4-8 to perform at least some of its actions.

Illustrative Network Device

Figure 3:
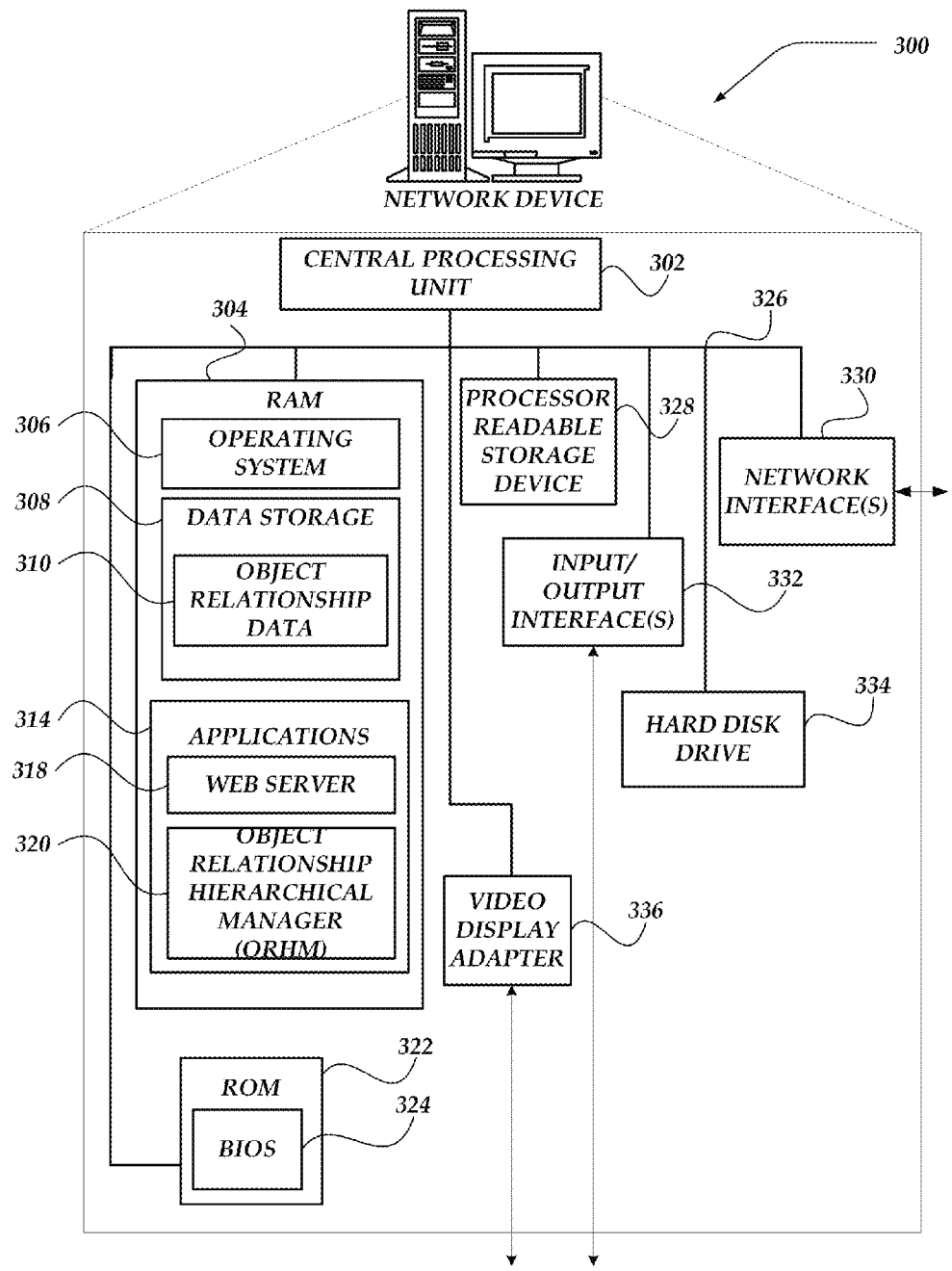
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, or any other device. Network device 300 may represent, for example DMS 109 of FIG. 1.

Network device 300 includes central processing unit 302, an input/output interface 332, video display adapter 336, and a mass memory, all in communication with each other via bus 326. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network device 300. Any general-purpose operating system may be employed. Basic input/output system ("BIOS") 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card ("NIC").

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage medium. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical medium which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses; or the like. Data stores 308 may further include program code, data, algorithms, and the like, for use by a processor, such as central processing unit ("CPU") 302 to execute and perform actions. In one embodiment, at least some of data store 308 might also be stored on another component of network device 300, including, but not limited to processor-readable storage medium 328, hard disk drive 334, or the like. Data storage 308 may further store object relationship data 310.

Object relationship data 310 may include object relationships and associated data received from another network device, such as client device 200 of FIG. 2. Object relationship data 310 may be configured substantially similar to object relationship data 210 of FIG. 2, as described above.

The mass memory may also stores program code and data. One or more applications 314 are loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web server 318 and object relationship hierarchical manager ("ORHM") 320 may also be included as application programs within applications 314.

Web server 318 represent any of a variety of services that are configured to provide content, including messages, over a network to another computing device. Thus, web server 318 includes, for example, a web server, a File Transfer Protocol ("FTP") server, a database server, a content server, or the like. Web server 318 may provide the content including messages over the network using any of a variety of formats including, but not limited to WAP, HDML, WML, SGML, HTML, XML, Compact HTML ("cHTML"), Extensible HTML ("xHTML"), or the like.

ORHM 320 may be configured substantially similar to ORHM 220 of FIG. 2, as described above. In any event, ORHM 320 may perform actions such as those described below in conjunction with FIGS. 4-8.

Generalized Application

Business entities may desire to quantify costs associated with various aspects of objects related to the business entity. In one embodiment, a business entity may desire to quantify costs associated with objects owned, controlled or otherwise operated by the business entity, provided to the business entity by a specific business department, such as, but not limited to, an information technology (IT) department, or the like. In one embodiment, object-related data pertaining to objects within a business department, such as an information technology (IT) may be collected and monitored. In other embodiments, business entities may desire to monitor, plan, and operate objects within one department of the business entity that are provided to one or more other departments and/or end business units, or to one or more other internal and/or external business entities. In some embodiments, object-related data may include information regarding data processing systems such as computer servers, employee computers or client systems and networking equipment (e.g., manufacturer, model numbers, serial identification numbers, asset tracking information, date of manufacture, upgrade or modification, types and versions of components or software incorporated therein, and purchase price). In other embodiments, object-related data may include (a) lists of work tickets (e.g., help desk call logs) and other information relating to activities of IT professionals, possibly broken down by time, (b) lists of vendor contracts (e.g., maintenance contracts for computer hardware and software), possibly to be apportioned to various departments and/or applications, and (c) any other data relating to the costs of object utilization (e.g., computer utilization percentages, how much data storage space is being used, relationship tables and/or application maps indicative of which particular objects are being utilized by which specific users). In some embodiments, object-related data may include a base value associated with an object.

In some embodiments, object-related data may be utilized to provide an accurate financial model that transforms relatively-tangible costs (e.g., the cost of a new server, rent for a data center, or salary paid to an employee) into intangible, but more business-aligned services (e.g., the cost of an email account or calls into the IT helpdesk because users forgot their passwords). In some embodiments, costs provided to and/or consumed by one object, such as, but not limited to, a service, may be different and/or independent of costs provided to and/or consumed by another object, such as, but not limited to, a business unit. Such different costs may, in one embodiment, utilize a same object hierarchical structure and in another embodiment, utilize a different and/or independent object hierarchical structures. In one embodiment, this may be done by accepting source input costs (e.g., in the form of a data from a General Ledger system, or in the form of a specified per-unit value, such as price) as well as actual and/or planned activity information (e.g., a list of all calls to the helpdesk, or all servers in the datacenter, or planned activities (For example, the average number of help desk calls per employee last year, and the number of employees expected for each month of next year)). The actual and/or planned activity information may also include information about a purpose of the object relationship. In one non-limiting example, the actual and/or planned activity information may include a comment and/or description of the object relationship, and/or a reason why the object relationship exists. In one embodiment, activity information may be an embodiment of an object relationship. In another embodiment, the source input costs may be an embodiment of a direct value of an object relationship between two objects (such as servers and a helpdesk). In one non-limiting, non-exhaustive example, some servers might be used for servicing email, while others may be used for running helpdesk software. Some helpdesk calls may be for requesting password changes, others may be to request help with a broken laptop. The costs may be broken down from their original source format into a cost per activity. This cost per activity can then be propagated up the object hierarchy based on how much of that activity has occurred, or is expected to occur. In one non-exhaustive example, records may indicate that call #775 from 9:03 am to 9:10 am on Jul. 3, 2010 was a password change request. In one embodiment, attributes of an individual call, such as duration or priority, and propagation rules, may be utilized to calculate costs as $5—comprised of $0.80 for a portion of the costs to run the servers supporting the helpdesk, and $4.20 for labor. In such an example, object relationships may be defined between the servers and the helpdesk with a direct value of $0.40, between labor and the helpdesk with a direct value of $4.20, between server storage and servers with a direct value of $0.40, and between each call and the servers which may have a negligible direct value, but identify all calls made to the helpdesk.

In this example, the object relationships may be utilized to generate an HSDOR (which is further described below in conjunction with FIG. 4), which may be utilized to calculate the total value of the password change "Service" (i.e. all the 'password change' ticket costs may be added together, and/or calculated without utilizing the individual tickets, but rather utilizing a percentage of the various cost sources that are associated with tickets of a particular type).

In other embodiments, object-related data may be utilized to calculate a cost per customer or business unit. When this cost is combined with revenue information, an application may calculate customer or business unit profitability. In one non-exhaustive example, a cost per customer may be one direct value and revenue may be another direct value for a given object relationship between objects. In some embodiments, a profitability of an object can be similarly modeled, where an expense of the object is one direct value, and a cost of the object is another direct value, using either the same or differing object hierarchical structures. Such computations are not limited to IT organizations or data, but may also be used to judge the effectiveness of marketing programs against particular customer segments, or, and at a higher level, may be used for all functions in an entire business in virtually any industry. In one non-exhaustive example, a travel management company may calculate the costs of running each of its websites (including consumer facing websites and websites for particular resellers, large customers or the government), and combine that cost with the marketing costs of promoting each website in order to produce total costs per function (where marketing costs and running costs may be different direct values or may be different object relationships from which the website depends). In other embodiments, further strategic business, operational and organizational analysis may be enabled by also measuring the revenue from each website and tracking historical performance through the use of an HSDOR.

General Operation

Figure 4:
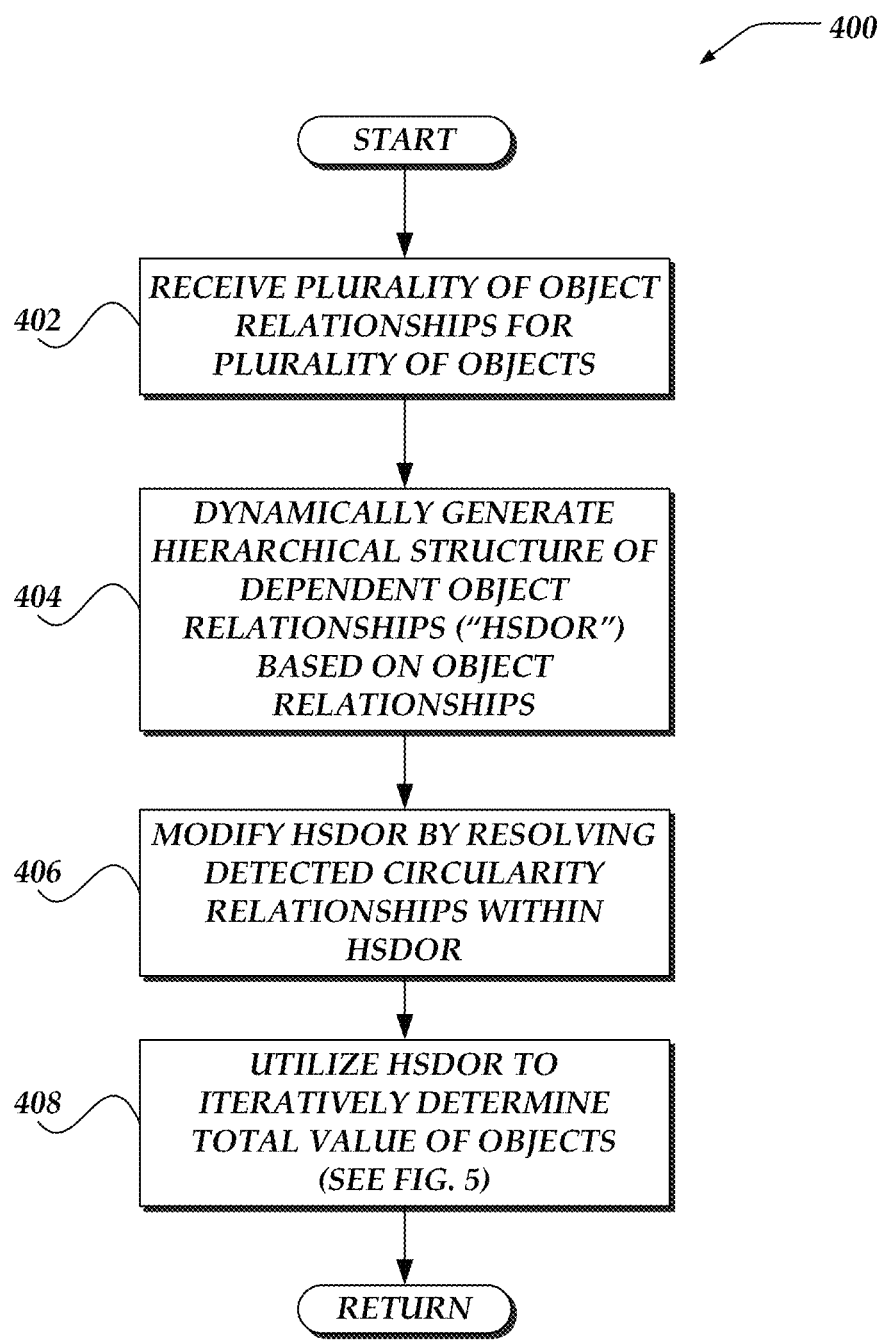
FIG. 4 illustrates a logical flow diagram generally showing one embodiment of an overview process for dynamically generating a hierarchical structure of dependent object relationships.

The operation of certain aspects of the invention will now be described with respect to FIGS. 4-8. FIG. 4 illustrates a logical flow diagram generally showing one embodiment of an overview process for dynamically generating a hierarchical structure of dependent object relationships ("HSDOR"). In some embodiments, process 400 of FIG. 4 may be implemented by and/or executed on a single network device, such as network device 300 of FIG. 3. In other embodiments, process 400 or portions of process 400 of FIG. 4 may be implemented by and/or executed on a plurality of network devices, such as network device 300 of FIG. 3.

Process 400 begins, after a start block, at block 402, where a plurality of object relationships is received for a plurality of objects. In some embodiments, the plurality of object relationships may be received from a client device. In one embodiment, each object relationship may include a first object (e.g. a consumer object), a second object (e.g. a provider object), and one or more direct values associated with a respective object relationship. In some embodiments, each object relationship may include a number of units (i.e. a quantity) or a percentage of an object utilized by a respective object relationship. In one embodiment, the quantity may indicate a number of units that a consumer object depends on from a provider object. In another embodiment, the quantity may indicate a number of units that a provider object provides to a consumer object.

In some embodiments, one or more object relationships may include a plurality of direct values. In one embodiment, each of the plurality of direct values may be independent of each other. In another embodiment, a subset of the plurality of direct values may be related and/or dependent on each other. In one non-limiting example, an object relationship may include a one time fee (i.e. a first direct value) and a periodic fee (i.e. a second direct value). In this example, the first and second direct values may be related because they are both based on fees. In some embodiments, propagation rules may be generated for generating and assigning a direct value to one or more object relationships based on a base value of an object. In some embodiments, propagation rules may also be referred to as allocation rules. A non-limiting, non-exhaustive example of generating propagation rules among objects is described below in the section titled "Example Propagation Rule Generation" and in conjunction with FIGS. 16-18.

In other embodiments, one or more object relationships may be a bidirectional object relationship. In a bidirectional object relationship, a first object may be a consumer object for a first direct value and a provider object for a second direct value, where a second object may be a provider object for the first direct value and a consumer object for the second direct value.

In some embodiments, the plurality of object relationships may be stored as a list of object relationships. In one embodiment, a table may be utilized to store the plurality of object relationships. In one non-exhaustive example, each row in the table may be an individual object relationship and each column may include different data associated with the object relationship. For example, separate columns may identify a consumer object, a provider object, one or more direct values, a quantity, or the like. In this embodiment, additional information may be specified in additional columns, such as, but not limited to, activity information, as described above. Although this description primarily describes utilization of a table to store a list of object relationships, embodiments are not so limited and other methods for storing data may be implemented.

In any event, process 400 next proceeds to block 404, where an HSDOR is dynamically generated based on dependencies of the plurality of object relationships. In one embodiment, the dependencies between object relationships may be determined by searching a list of object relationships and identifying those object relationships where a consumer of a first object relationship is a provider of a second object relationship.

In some embodiments, the HSDOR may be dynamically generated by modifying each object relationship to include a link, or other identifier, to other object relationships from which a respective object relationship depends. In other embodiments, the HSDOR may be dynamically generated by creating a graph of objects and associated object relationships based on the identified dependencies. In one embodiment, each node in the graph may be a unique object (consumer or provider), each edge between nodes may be an object relationship, and each edge may include a direct value associated with the object relationship. In some embodiments, each edge may include a weight associated with the object relationship. In one embodiment, the weight may be a quantity and/or a percentage of an object consumed by the object relationship. In some embodiments, the dependency of an object relationship may be indicated by a directional edge. For example, an edge may flow from a provider object to a consumer object. In some embodiments, where an object relationship includes a plurality of direct values and/or is a bidirectional object relationship, a plurality of edges and/or directional edges may be between a same two nodes.

Continuing to block 406, the HSDOR is modified by resolving any detected circularity relationships within the HSDOR. In some embodiments, block 406 may be optional.

In one embodiment, the circularity relationship may be detected by traversing the HSDOR for reverse directional flows for a given direct value. Circularity relationships may be treated as a system of simultaneous mathematical equations, and strategies for calculating an optimal result include substitution, elimination and, ultimately, running Monte Carlo simulations.

In some embodiments, resolving the detected circularity relationships may include zeroing a direct value associated with the detected circularity relationship. In other embodiments, resolving the detected circularity relationships may include flagging the circularity relationship. In one embodiment, a direct value associated with the flagged circularity relationship may be ignored if the circularity relationship is a reverse directional flow based on a selected object for determining a total value of the selected object. In some other embodiments, resolving the detected circularity relationships may include approximating total values of objects and total loaded values of object relationships associated with the detected circularity relationship by using a direct value of the circularity relationship a predetermined times, such as, in one non-limiting example, one time. In still another embodiment, the flagged circularity relationship might initiate a request for a user to resolve the circularity relationship, such as modifying the input data.

Process 400 continues to block 408, which is described in more detail below in conjunction with FIG. 5. Briefly, however, at block 408, the HSDOR is utilized to iteratively determine a total value of an object within the plurality of object relationships.

After block 408, process 400 returns to a calling process to perform other actions.

Figure 5:
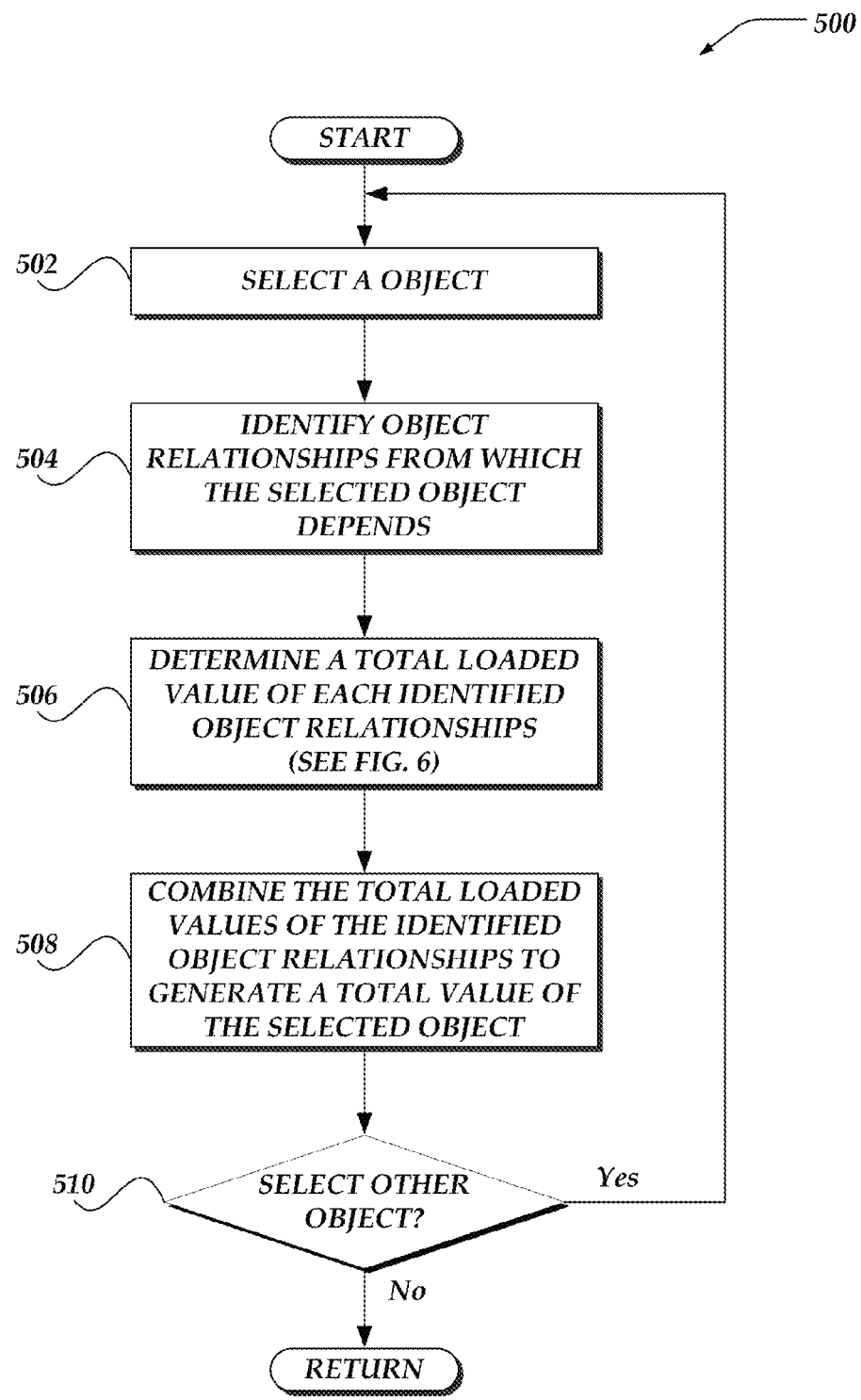
FIG. 5 illustrates a logical flow diagram generally showing one embodiment of a process for determining a total value of an object in a hierarchical structure of dependent object relationships.

FIG. 5 illustrates a logical flow diagram generally showing one embodiment of a process for determining total values of an object in an HSDOR. In some embodiments, process 500 of FIG. 5 may be implemented by and/or executed on a single network device, such as network device 300 of FIG. 3. In other embodiments, process 500 or portions of process 500 of FIG. 5 may be implemented by and/or executed on a plurality of network devices, such as network device 300 of FIG. 3.

Process 500 begins, after a start block, at block 502, where an object is selected. In some embodiments, a user of a client device, such as client device 200 of FIG. 2, may select an object. In other embodiments, an object may be automatically selected. In some embodiments, an object associated with a new and/or modified object relationship may be automatically selected. In other embodiments, an object that depends on a new and/or modified object relationship may be automatically selected. In yet other embodiments, the HSDOR may be traversed to automatically select an object. In one embodiment, the HSDOR may be traversed, such as by a depth-first traversal, to automatically select each object.

In any event, processing flows to block 504, where object relationships are identified from which the selected object depends. In one embodiment, an identified object relationship may be an object relationship in which the selected object is a consumer object. In some embodiments, the HSDOR may be searched for each object relationship where the selected object is a consumer object. As described above, one representative embodiment of the HSDOR may be graph where each object may be a node and each object relationship may be an edge between nodes. In such an embodiment, edges that flow into the selected object may be identified as object relationships from which the selected object depends.

Process 500 next proceeds to block 506, which is described in more detail below in conjunction with FIG. 6. Briefly, however, at block 506, a total loaded value is determined for each of the identified object relationships.

Continuing to block 508, the total loaded values of the identified object relationships are combined to generate a total value of the selected object. In one embodiment, the total loaded values of the identified object relationships may be added together to generate the total value of the selected object.

In some embodiments, the total value of the selected object may be iteratively determined by combining a total loaded value of object relationships that share the given object as a consumer object. In one embodiment, a total value may be iteratively determined by traversing edges on a graph representation of an HSDOR. In one embodiment, the total value of the selected object may be calculated using the following equations:

$$TV_S = TLV_j + TLV_{j+1} + \ldots + TLV_{j+n}), \text{ where:}$$

TV is a total value of an object;
S is the selected object;
TLV is a total loaded value of an object relationship; and
j, j+1, . . . , j+n are object relationships where the consumer object is the selected object, S.

In any event, process 500 then proceeds to decision block 510, where a determination is made whether another object is selected. In one embodiment, another object may be selected if a user of a client device selects another object. In another embodiment, another object may be automatically selected, such as an object dependent on a new and/or modified object relationship and/or a new object in a depth-first traversal of the HSDOR. If another object is selected, then processing flows to block 502 where the other object is selected; otherwise, processing returns to a calling process to perform other actions.

Figure 6:
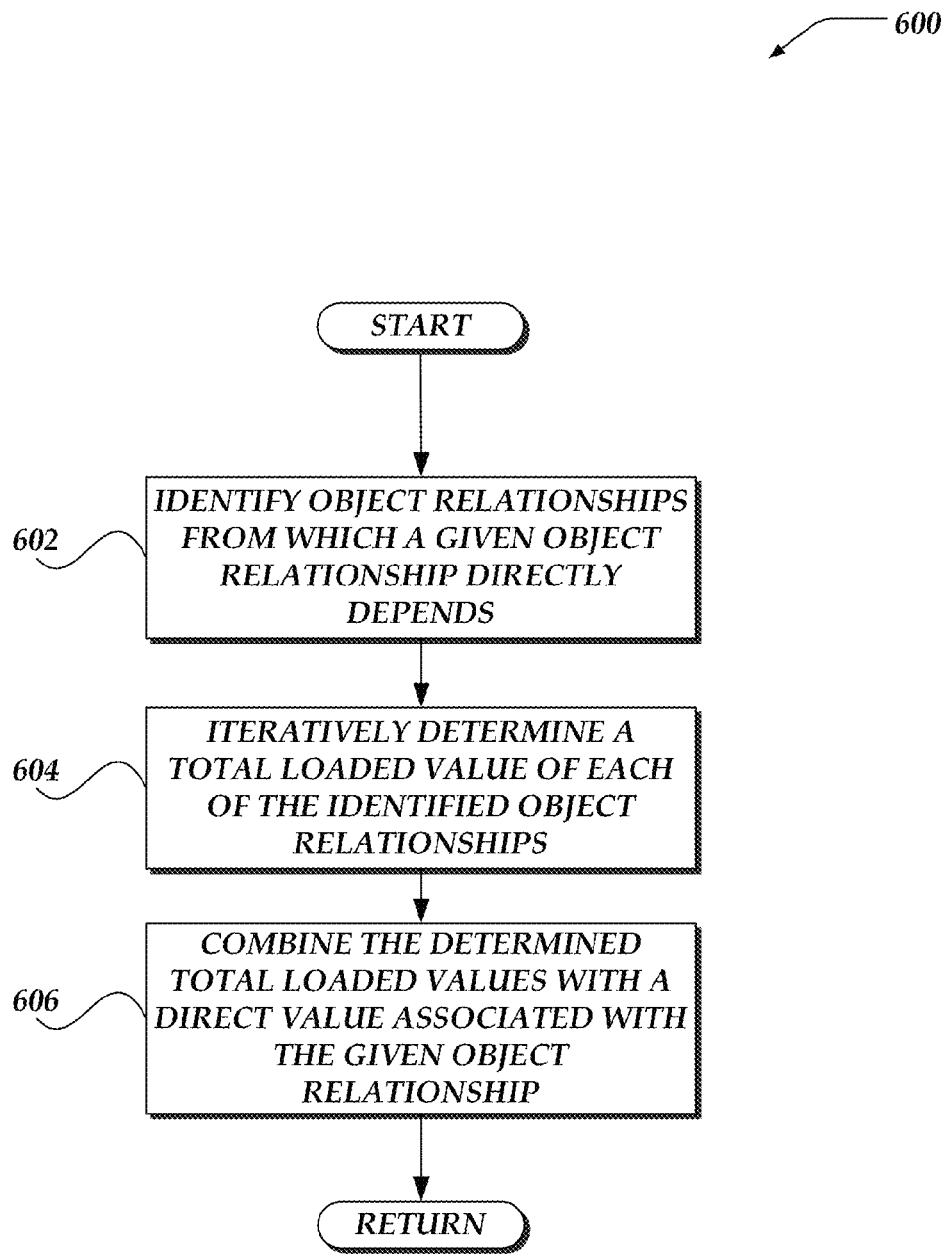
FIG. 6 illustrates a logical flow diagram generally showing one embodiment of a process for iteratively determining total loaded values of object relationships in a hierarchical structure of dependent object relationships.

FIG. 6 illustrates a logical flow diagram generally showing one embodiment of a process for iteratively determining total loaded values of object relationships in an HSDOR. In some embodiments, process 600 of FIG. 6 may be implemented by and/or executed on a single network device, such as network device 300 of FIG. 3. In other embodiments, process 600 or portions of process 600 of FIG. 6 may be implemented by and/or executed on a plurality of network devices, such as network device 300 of FIG. 3.

Process 600 begins, after a start block, at block 602, where object relationships are identified from which a given object relationship directly depends. In one embodiment, a first object relationship may directly depend on a second object relationship where the first object relationship includes a provider object that is also a consumer object of the second relationship.

Process 600 next proceeds to block 604, where a total loaded value of each of the identified object relationships is iteratively determined. In one embodiment, the total loaded value of each of the identified object relationships may be iteratively determined by repeating steps 602, 604 and 606 for each object relationship, until an object relationship does not depend on another object relationship. In another embodiment, total loaded values may be iteratively determined by traversing edges on a graph representation of an HSDOR. Once an object relationship does not depend on another object relationship, the total loaded value of that object relationship may be a direct value of the object relationship.

Continuing to block 606, the determined total loaded values for each of the identified object relationships are combined with a direct value associated with the given object relationship. In one embodiment, the determined total loaded value of a given object relationship may be determined by the equation:

$$TLV_X = Q_X(DV_X + TLV_i + TLV_{i+1} + \ldots + TLV_{i+n}), \text{ where:}$$

TLV is the total loaded value for an object relationship;
X is a given object relationship;
$Q_X$ is a quantity (i.e. a number of units) demanded from a provider object by a consumer object of the given object relationship, X;
i, i+1, . . . , i+n are object relationships from which the given object relationship, X, directly depends; and
$DV_X$ is the direct value of the given object relationship, X.

In other embodiments, the total loaded value of a given object relationship may be determined by combining a quantity provided by a provider object of the given object relationship to a consumer object of the given object relationship with direct value of the given object relationship and a total value of the provider object of the given object relationship. In one embodiment, the determined total loaded value of a given object relationship may be determined by the equation:

$$TLV_X = Q_X(DV_X + TV_{X1}), \text{ where:}$$

TLV is the total loaded value for an object relationship;
X is a given object relationship;
X1 is a provider object in the given object relationship, X;
$Q_X$ is a quantity (i.e. a number of units) demanded from a provider object, X1, by a consumer object of the given object relationship, X;
$DV_X$ is the direct value of the given object relationship, X; and
TV is the total value of an object relationship.

After block 606, process 600 returns to a calling process to perform other actions.

Figure 7:
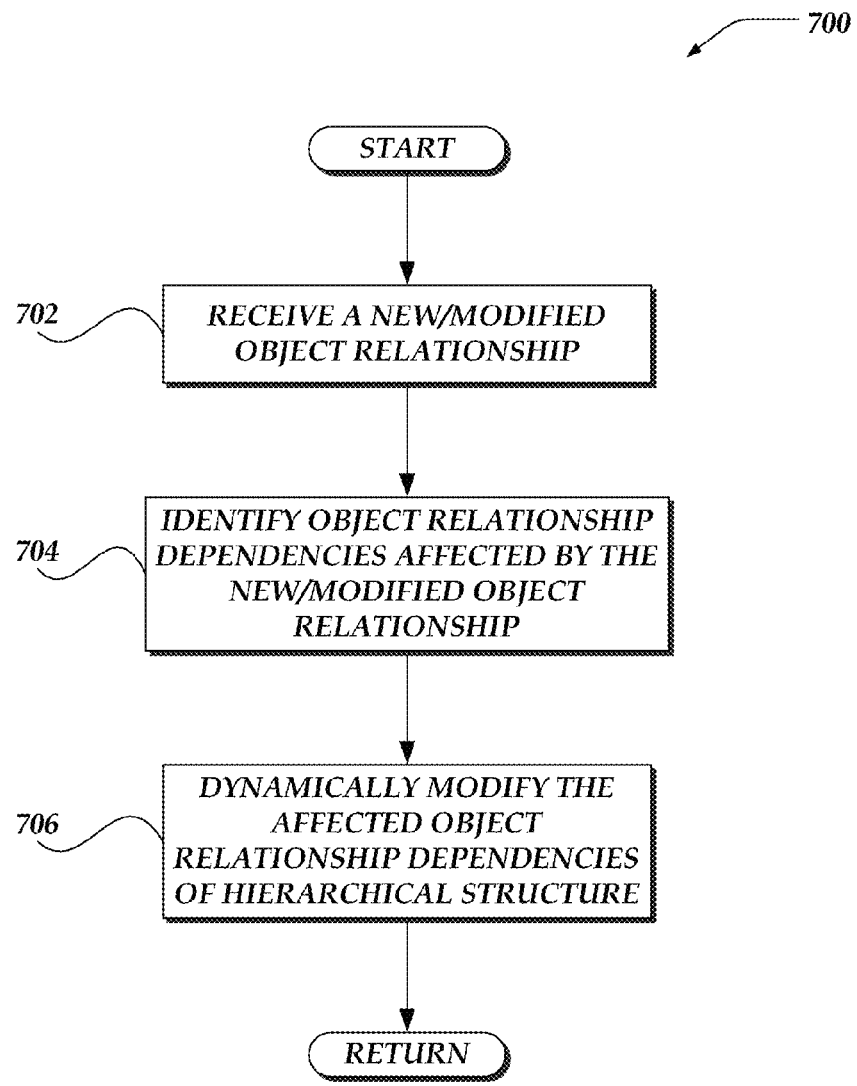
FIG. 7 illustrates a logical flow diagram generally showing one embodiment of a process for dynamically modifying a hierarchical structure based on a new or modified object relationship.

FIG. 7 illustrates a logical flow diagram generally showing one embodiment of a process for dynamically modifying a HSDOR based on a new or modified object relationship. In some embodiments, process 700 of FIG. 7 may be implemented by and/or executed on a single network device, such as network device 300 of FIG. 3. In other embodiments, process 700 or portions of process 700 of FIG. 7 may be implemented by and/or executed on a plurality of network devices, such as network device 300 of FIG. 3.

Process 700 begins, after a start block, at block 702, were a new and/or modified object relationship is received. In some embodiments, a new object relationship may be received similar to that which is described above in conjunction with block 402 of FIG. 4. In other embodiments, an existing object relationship may be modified. In one embodiment, a consumer object of an existing object relationship may be modified to be a new or different existing consumer object. Similarly, in another embodiment, a provider object of an existing object relationship may be modified to be a new or different existing provider object. In other embodiments, one or more direct values of an object relationship may be added and/or modified.

Process 700 next proceeds to block 704, where object relationship dependencies affected by the new and/or modified object relationship are identified. In one embodiment, dependencies affected by the new and/or modified object relationship may be identified by traversing the HSDOR and iteratively identifying those object relationships where a consumer object of a first object (i.e. starting with the new and/or modified object relationship) is a provider of a second object relationship.

Continuing next to block 706, the identified affected object relationship dependencies of the HSDOR are dynamically modified. In one embodiment, the affected object relationship dependencies HSDOR may be modified similar to that which is described above for generating the HSDOR in conjunction with block 406 of FIG. 4. In other embodiments, a total loaded value of each identified affected object relationship may be modified, such as by a process similar to that which is described in conjunction with process 600 of FIG. 6.

After block 706, process 700 returns to a calling process to perform other actions.

Figure 8:
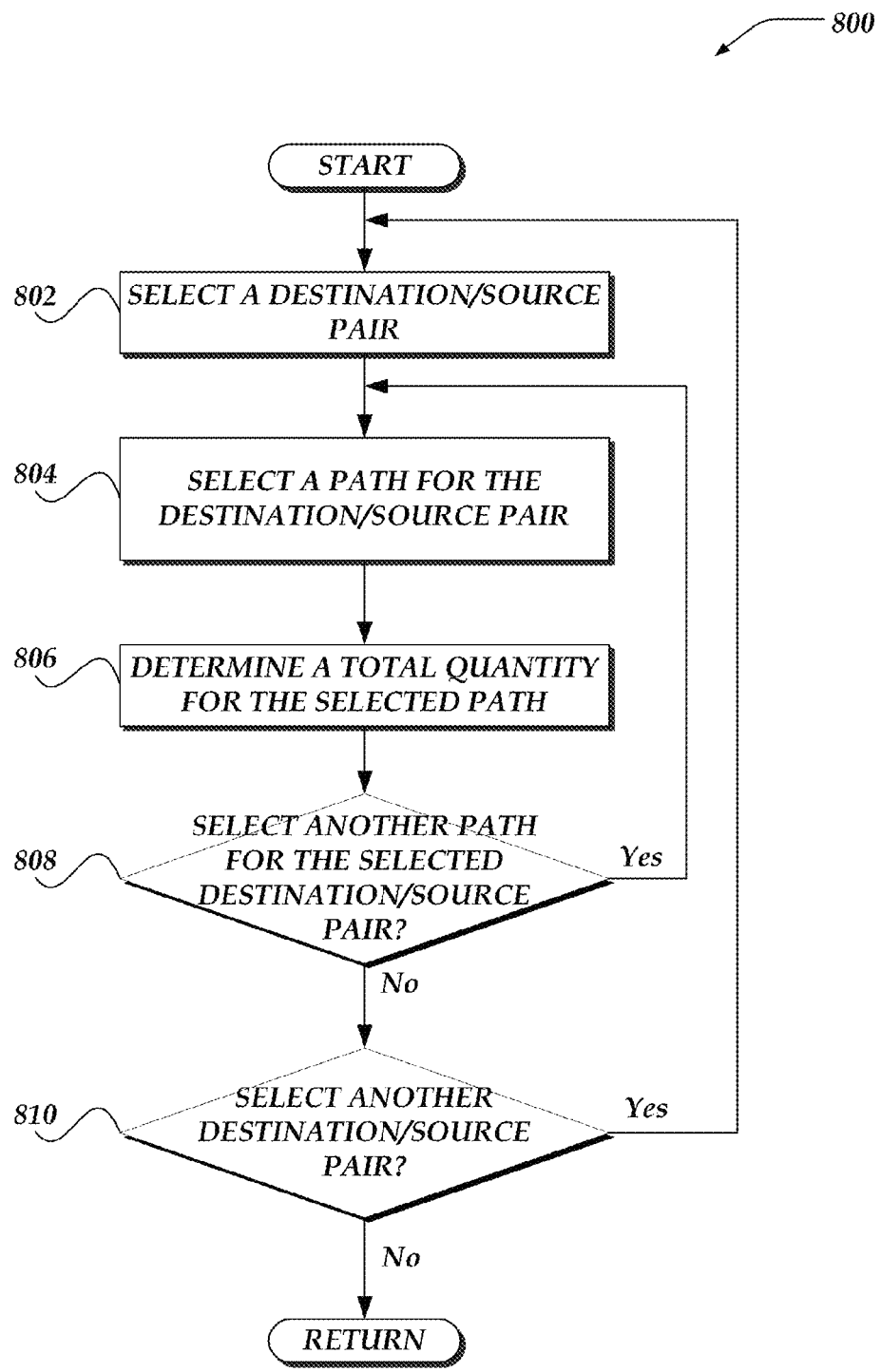
FIG. 8 illustrates a logical flow diagram generally showing one embodiment of a process for generating an object hierarchy transform.

FIG. 8 illustrates a logical flow diagram generally showing one embodiment of a process for generating an object hierarchy transform. In some embodiments, process 800 of FIG. 8 may be implemented by and/or executed on a single network device, such as network device 300 of FIG. 3. In other embodiments, process 800 or portions of process 800 of FIG. 8 may be implemented by and/or executed on a plurality of network devices, such as network device 300 of FIG. 3.

Process 800 begins, after a start block, at block 802, where a destination/source pair is selected. In one embodiment, the destination/source pair may be selected by selecting an object (i.e. destination object) that is directly or indirectly dependent on another object (i.e. source object).

Process 800 then flows to block 804, where a path for the destination/source pair is selected. In some embodiments, the HSDOR may be utilized to select a path between the selected destination object and the source object in the selected destination/source pair.

Process 800 continues at block 806, where a total quantity for the selected path is determined. In one embodiment, the total quantity may be determined by combining a quantity associated with each object relationship along the selected path for the destination/source pair. In one embodiment, the total quantity may be calculated by multiplying the quantity of each object relationship along the selected path. In some embodiments, a destination/source pair may include a plurality of total quantities, where each total quantity is associated with a different path between the destination object and the source object. In other embodiments, a destination/source pair may include a total quantity determined by adding a total quantity of a plurality of paths between the destination object and the source object.

Process 800 then proceeds to decision block 808 where a determination is made whether another path is selected. In some embodiments, another path may be selected if a different path exists between the destination object and the source object. In one embodiment, the other path may be selected based on a depth-first traversal of the HSDOR. If another path is selected, then processing loops to block 804; otherwise, processing flows to decision block 810.

At decision block 810, a determination is made whether another destination/source pair is selected. In one embodiment, another source object may be selected based on a depth-first traversal of the HSDOR. In some embodiments, each destination/source pair in the HSDOR may be individually selected to generate the object hierarchy transform. If another destination/source pair is selected, processing loops to block 802 to select another destination/source pair; otherwise, processing returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Use Case Illustrations

FIG. 9 show one embodiment of a use case illustrating a list of object relationships for generating an HSDOR. In some embodiments, table 900 may be generated from a graphical user interface, such as described in more detail below in conjunction with FIG. 15. As illustrated, the list of object relationships is defined in Table 900. However, other methods of storing and defining object relationships may be employed. Table 900 includes object relationships 901. Table 900 also includes Object_1 902, Object_2 904, quantity 906, direct demand 908, and direct price 910.

Object_1 902 and Object_2 904 may be a provider object or a consumer object for a given direct value of a given object relationship. Quantity 906 may be a number of units being provided from one object to another object. In some embodiments, quantity 906 may also be a percentage of the costs that should flow from one object to another. Direct demand 908 may be a direct value of demand provided by Object_1 902 to Object_2 904, such as a price per unit or a quantity. Direct price 910 may be a dollar amount per unit for a direct value of a price provided by Object_2 904 to Object_1 902.

In this use case, direct demand 908 and direct price 910 may enable a subset of object relationships 901 to be bidirectional, such as object relationship 914. For example, object relationship 914 includes Business Unit 1 and Service-60. For direct price 910, Service-60 (a provider object) provides a direct price of 4 dollars per unit to Business Unit 1 (a consumer object). For direct demand 908, Business Unit 1 (a provider object) is providing a direct demand for 2 units of Service-60 (consumer object). As shown, object relationship 914 also includes a quantity of 5, such that Service-60 is providing 20 dollars of direct price to Business Unit 1 and Business Unit 1 is providing 10 units of direct demand to Service-60. It should be recognized by one skilled in the art that other numbers of object relationships, values, objects, or the like may be employed.

Figure 10:
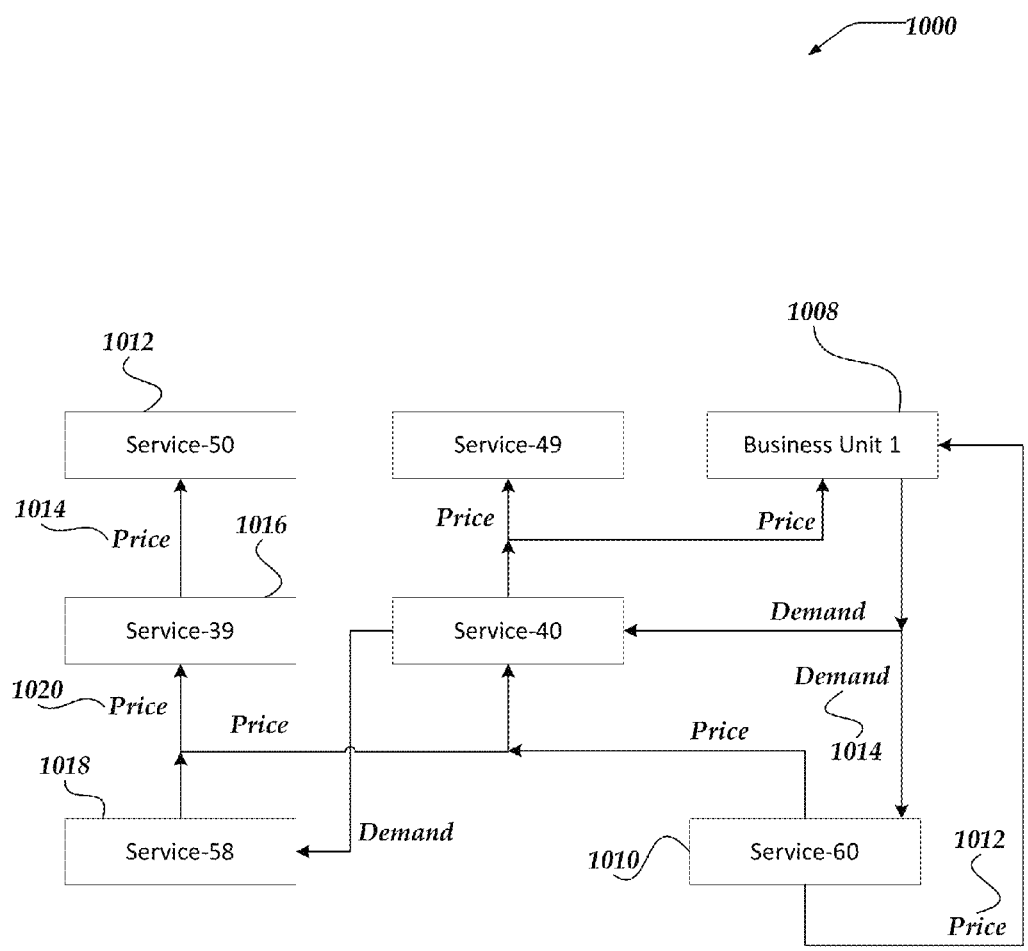
FIG. 10 shows one embodiment of a use case illustrating a hierarchical structure of dependent object relationships generated from a list of object relationships, such as the list of object relationships shown in FIG. 9.

FIG. 10 shows one embodiment of a use case illustrating an HSDOR generated from a list of object relationships, such as the list of object relationships shown in FIG. 9. Hierarchical structure 1000 may include a plurality of unique objects, such as object 1008 and object 1010, for example. Each unique object may be identified by traversing through a list of object relationships, such as table 900 of FIG. 9. Each edge in hierarchical structure 1000 may represent an object relationship between objects, where a direction of each edge may indicate a dependency between objects. For example, price 1012 may be a direct value provided by object 1010 to object 1008, such as the direct value for direct price 910 for object relationship 914 of FIG. 9. Similarly, demand 1014 may be a direct value provided by object 1008 to object 1010, such as the direct value for direct demand 908 for object relationship 914 of FIG. 9.

In some embodiments, an object relationship may include an indirect value based on direct values of object relationships from which the object relationship depends. As shown in FIG. 10, the object relationship between object 1012 and object 1016 may include direct price 1014. However, the object relationship between object 1012 and object 1016 may also include an indirect value from the object relationship between object 1016 and object 1018, such as, in one embodiment, price 1020.

Figure 11A:
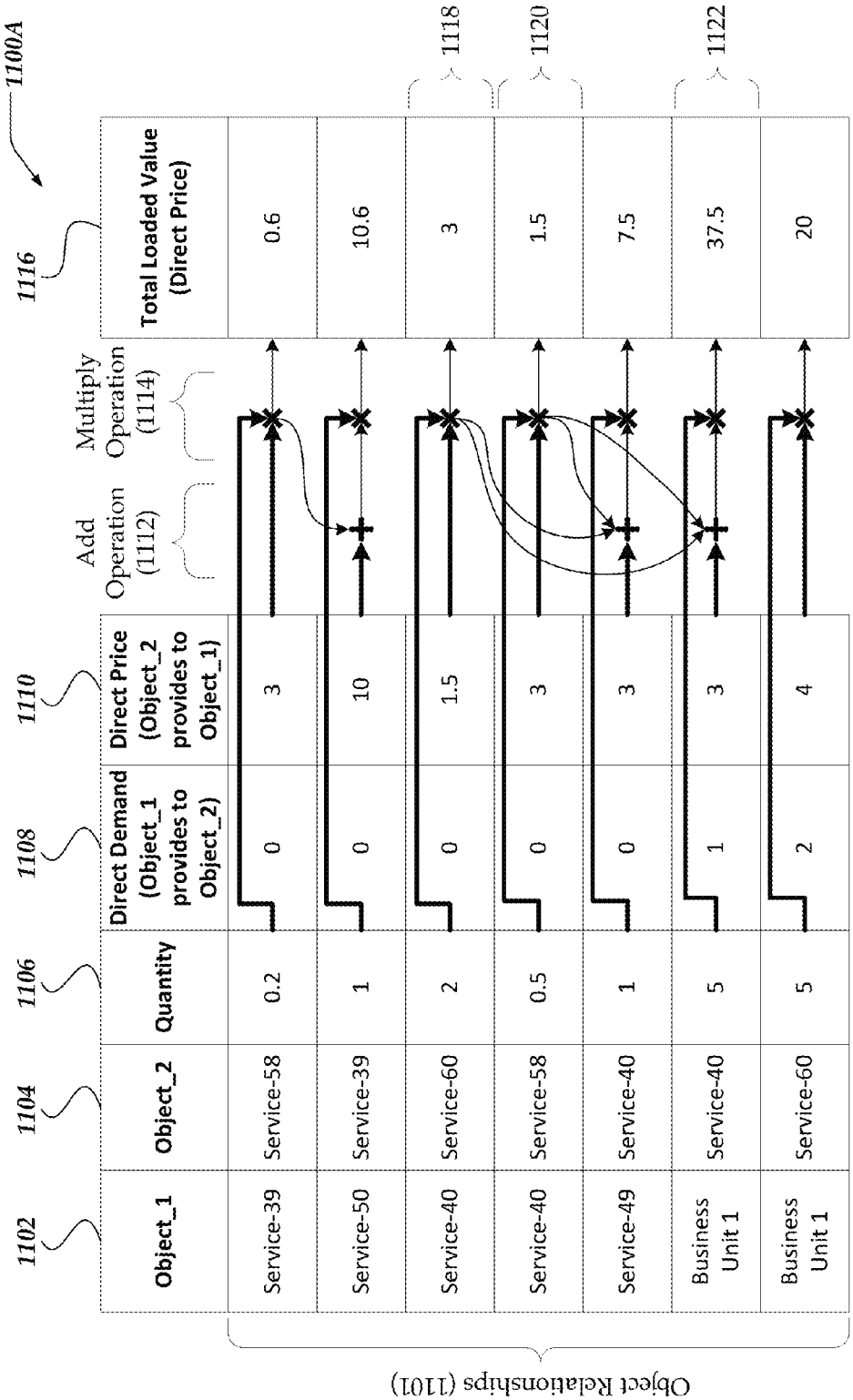
FIG. 11A shows one embodiment of a use case illustrating a total loaded value for each object relationship determined from a hierarchical structure of dependent object relationships.

FIG. 11A shows one embodiment of a use case illustrating a total loaded value for each object relationship determined from an HSDOR. As illustrated, the HSDOR is defined in Table 1100A. However, other methods of storing and defining object relationships may be employed. Table 1100A includes object relationships 1101, Object_1 1102, Object_2 1104, quantity 1106, direct demand 1108, and direct price 1110. Object_1 1102 may be similar to Object_1 902 of FIG. 9. Object_2 1104 may be similar to Object_2 904 of FIG. 9. Quantity 1106 may be similar to quantity 906 of FIG. 9. Direct demand 1108 may be similar to direct demand 908 of FIG. 9. Direct price 1110 may be similar to direct price 910 of FIG. 9.

As shown, total loaded value 1116 may be calculated for the direct price (1110), where the consumer object is Object_1 1102 and the provider object is Object_2 1104. Add operation 1112 adds the direct value of a given object relationship with the total loaded values of object relationships from which the given object relationship depends. In one embodiment, the total loaded values to be added may be identified by traversing the HSDOR for object relationships with a consumer object that is also the provider object of the given object relationship. For example, the total loaded values to be added to the direct value of object relationship 1122 may be the total loaded values of object relationships 1118 and 1120 because Service-40 is a consumer object (Object_1 1102) for object relationships 1118 and 1120, but is also a provider object (Object_2 1102) for object relationship 1122.

The results of add operation 1112 may then be multiplied by quantity 1106 at multiply operation 1114 to produce total loaded value 1116. Simplified, total loaded value 1116 for a given object relationship is equal to the quantity 1106 multiplied (1114) by the sum (1112) of the direct value of the given object relationship and the total loaded values of object relationships from which the given object relationship depends. For example, the total loaded value of object relationship 1122 for direct price is equal to quantity 1106 multiplied by sum of the direct price 1110 and total loaded value of object relationship 1118 and total loaded value of object relationship 1120 (5×(3+3+1.5)=37.5, in this non-exhaustive example).

Figure 11B:
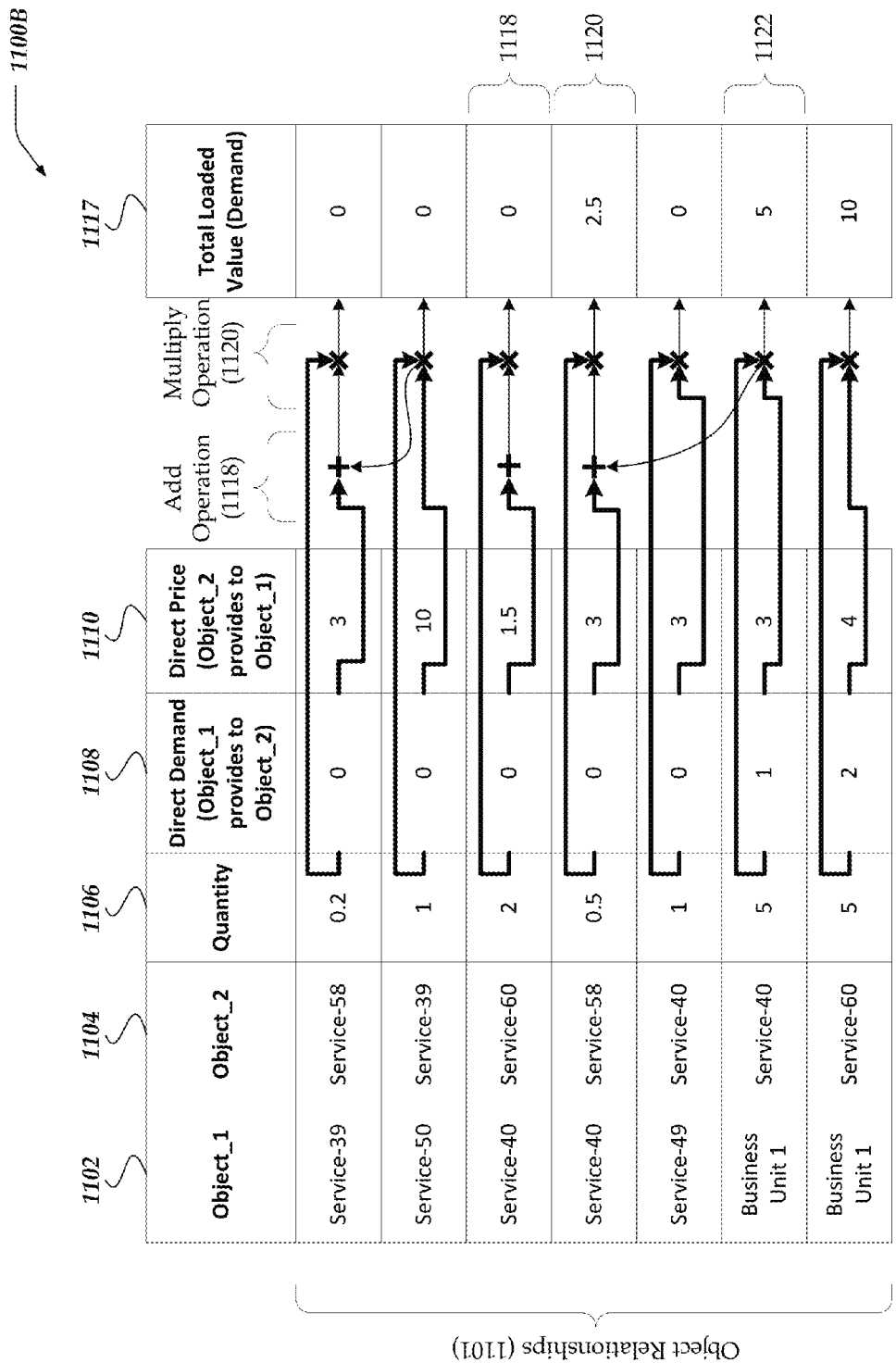
FIG. 11B shows another embodiment of a use case illustrating a total loaded value for each search relationship determined from a hierarchical structure of dependent object relationships.

FIG. 11B shows another embodiment of a use case illustrating a total loaded value for each search relationship determined from an HSDOR. The total loaded value 1117 for the direct demand may be calculated similar to that which is described above in conjunction with FIG. 11A. However, total loaded value 1117 may be calculated for the direct demand, where the consumer object is Object_2 1102 and the provider object is Object_1 1104. For example, the total loaded value of object relationship 1120 for direct demand is equal to quantity 1106 multiplied by sum of the direct demand 1108 and total loaded value of object relationship 1122 (0.5×(0+5)=2.5, in this non-exhaustive example).

FIG. 12 shows one embodiment of a use case illustrating a list of objects and a related total value of each object based on determined total loaded values of associated object relationships, such as the total loaded values shown in FIG. 11A. Table 1200 may include objects 1202, consumer 1204, and total value 1206. In one embodiment, total value 1206 of a given object from objects 1202 may be calculated by adding the total loaded value of each object relationship where the given object is a consumer, such as from FIG. 11A. For example, a total value 1206 for object 1208 may be equal to the sum of the total loaded value 1116 for object relationships 1118 and 1120 from FIG. 11A (3+1.5=4.5, in this non-exhaustive example).

Figure 13:
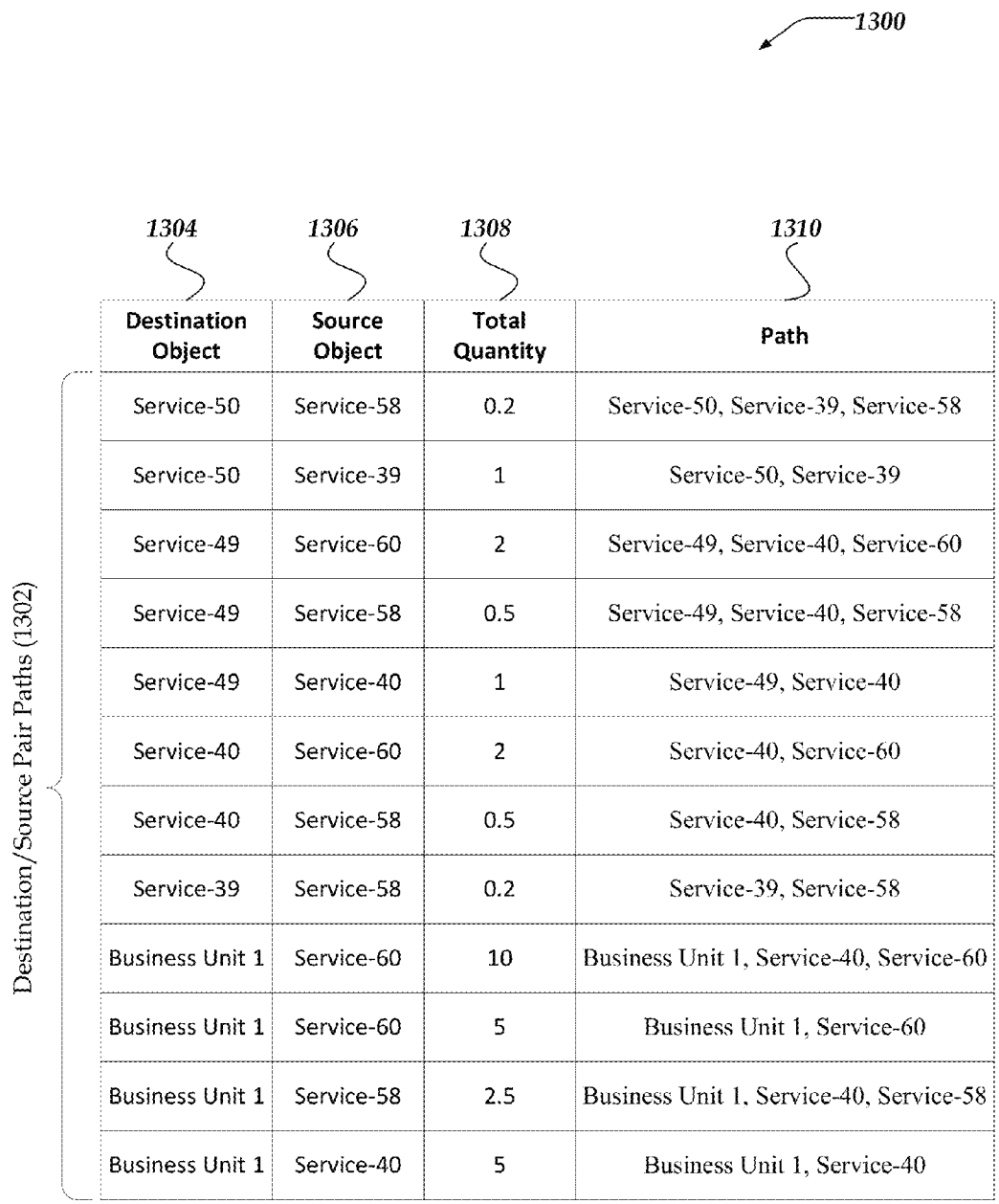
FIG. 13 shows one embodiment of a use case illustrating an object hierarch transform for a hierarchical structure of dependent object relationships.

FIG. 13 shows one embodiment of a use case illustrating an object hierarchy transform for an HSDOR. In one embodiment, an object hierarchy transform determines a number of provider object (source object) units utilized (total quantity) by a consumer object (destination object) for a given path from the provider object to the consumer object. As shown in FIG. 13, object hierarchy transform 1300 may include destination/source pair paths 1302, destination object 1304, source object 1306, total quantity 1308, and path 1310. Destination object 1304 may be a destination object of a given destination/source pair. Source object 1306 may be a source object of a given destination/source pair. Path 1310 may identify the objects and/or object relationships traversed between the destination object 1304 and the source object 1306 along a given path. In some embodiments, destination/source pair paths 1302 may include a destination/source pair for each path (as shown). In other embodiments, destination/source pair paths 1302 may include a single destination/source pair that include a total quantity calculated by added the total quantity of each path between the source object and the destination object (not shown).

FIG. 14 shows one embodiment of a graphical user interface ("GUI") for showing total values of a plurality of objects. Objects 1402 may include a plurality of objects within an HSDOR. Total values 1404-1406 show a total value of each of objects 1402 associated with different direct values. For example, total value 1404 may be calculated based on direct values for planned price, total value 1405 may be calculated based on direct values for setup fees, and total value 1406 may be calculated based on direct values for shutdown fees. Also shown in FIG. 14, objects 1402 may be separated by an object type, such as, but not limited to, application servers 1408, collaboration, 1410, employee 1412, and equipment 1414. One of ordinary skill in the art would understand that other object types may also be employed.

Example Propagation Rule Generation

As noted above, in some embodiments, propagation rules may be generated for generating and assigning a direct value to one or more object relationships based on a base value of an object. In some embodiments, propagation rules may define a relationship between a set of objects and manage the flow of object-related data between at least a subset of the respective objects. In one embodiment, propagation rules may generate object relationships. In some embodiments, object-related data may include a direct value between the objects in an object relationship. A propagation rule may define object relationships between two, three, or more objects. In some embodiments, a propagation rule may define object relationships between a variable numbers of objects.

In some embodiments, propagation rules may be defined by a user or may be received from a data source (for example retrieved from a database). Subsequent to being defined, each of the propagation rules may be modified by the user, or automatically modified. In one embodiment, the propagation rules may be dynamically modified to address anomalies within the plurality of object relationships and/or within the HSDOR. Such anomalies may include, but are not limited to, errors, inaccuracies, inappropriate application of specific rules or algorithms to specific classes of data, inappropriate initialization of variables, or any other incorrect, unexpected or undesirable system or data conditions. In some embodiments, anomalies may include circularity relationships, as described above in conjunction with block 406 of FIG. 4.

In one embodiment, to identify the occurrence of anomalies a set of tracking logic modules that are adapted to monitor the flow and processing of data and to identify the occurrence of such anomalies may be incorporated. In some embodiments, one or more of these tracking logic modules may also be employed to evaluate a source and nature of any detected anomalies, and possibly to resolve or facilitate the resolution of such anomalies.

In one embodiment, if an anomaly is detected, an attempt to remedy the anomaly may be automatically performed. This may happen, for example, if the anomaly is flagged, such as by outputting a message on a display, by sending an email, by sending a page or text message to a mobile device, or by uploading a message to a website for a user, and no response is received within a predetermined time. An attempt to remedy an anomaly may also happen if it is determined that the anomaly exhibits certain characteristics that require a prompt resolution (e.g., the anomaly is likely to critically affect data processing, such as a disconnect between two subsets of objects in an HSDOR). In one embodiment, to automatically remedy an anomaly, one or more of the propagation rules may automatically modify, such as by removing a previously added propagation rule and/or ignoring one or more propagation rules.

In one embodiment, a model calculation engine (sometimes also denoted a "propagation calculation engine") utilizes one or more propagation rules to calculate an instantiation for each instance of each object that participates in a model. The instantiation may be a monetary value, a quality measurement, a quantity measurement, a utilization measurement, or another number, value or metric.

In some embodiments, one or more tables of objects may be utilized by the propagation calculation engine. Thus, the following description of propagation rules may refer to source rows and/or destination rows. A source row may be an entry in a data table for a provider object, which may include information about the provider object, such as an identifier, a base value, or the like. A destination row may be an entry in a data table for a consumer object, which may include information about the consumer object, such as an identifier, a base value, or the like. In some embodiments, one data table may include source rows and a different table may include destination rows. In one such embodiment, a source row and/or a destination row may include a link to a corresponding source or destination table, such as to create a fully linked table. In other embodiments, a single data table may be a fully linked table and may include both source rows and destination rows.

In one embodiment, a propagation calculation engine utilizes one or more propagation rules to process objects to generate an application using the following steps:
 (1) the propagation calculation engine receives a set of propagation rules to be processed;
 (2) the propagation calculation engine selects one of the propagation rules;
 (3) the propagation calculation engine determines an object input that can be directly calculated (e.g., because all necessary components have been calculated or are directly available from a table;
 (4) the propagation calculation engine determines a set of matching source and destination rows (i.e. a set of object relationships) and alters a value associated with the object relationship. In one embodiment, a cost at the destination may be modified (e.g., increases the value) by the result of the propagation rule; and
 (5) the propagation calculation engine checks if all propagation rules in the current set have been processed, and if not, selects another propagation rule for processing.

In some embodiments, a propagation rule may be configured to use one or more types of matching algorithms, including any one or more of the following:

a. Simple Automated Algorithm

In some embodiments, a simple automated algorithm may employ a set of rules, such as the following:
 (i) All/All—each source row may have an object relationship to all destination rows;
 (ii) All/Some—each source row may have an object relationship to some of the destination rows. The destination rows in this case may be rows meeting a certain data criteria from a fully linked table (using a standard filtering algorithm, such as "Type='Foundational'"), or may be individually identified;
 (iii) Some/All—not all source rows are considered, but for those that are, each may have an object relationship to all destination rows. The source rows are determined using a standard filtering mechanism (e.g., as in rule (ii) above) or individually identified; and
 (iv) Some/Some—not all source rows are considered, not all destination rows are considered, as described in rules (ii) and (iii) above. Each source row that is considered may have an object relationship to every destination row that is considered.

b. Schema-Based Algorithm

In some embodiments, a schema-based algorithm may employ a set of rules in which source rows may have an object relationship to destination rows depending upon object relationships as determined by a schema generator.

c. Manual Relationship Algorithm

In some embodiments, a manual relationship algorithm (e.g., an algorithm in which object relationships are made based on human input) may employ a set of rules, such as the following:
 (i) Collaborative Table—the source row to destination row mapping (i.e. resource relationships) (including possible a percentage of rollups) is explicitly entered by one or more users. Actual percentages, weights, or quantities can be entered, or, on a per-source row basis, a simple weighting strategy can be specified; and
 (ii) Multiple Rules—a user enters multiple "rules" that are each evaluated in turn against the source table until one of the rules matches. Non-limiting, non-exhaustive examples of rules that may be entered include the rules discussed above in connection with simple automated algorithms and schema-based algorithms. Such multiple rules are often useful for mapping financial transaction ledgers (for example a general ledger) into multiple objects.

d. Distribution Strategies for Propagation Rules

In various embodiments, a propagation rule may be configured with a distribution strategy for when the value from a source row must be split across multiple destination rows. Non-limiting, non-exhaustive examples of distribution strategies include the following:

(i) Even: The value for each destination row from a particular source row is calculating by dividing the source value by the number of destination rows. This is represented internally as: =SOURCE/~(.Count). "SOURCE" is a variable that is replaced with the value from the source row. A tilde (~) is an operator that evaluates to the sum of matching values from a column—in this case, the special ".Count" column that has a value of 1.

(ii) Simple weighting: The value for each destination row from a particular source row may be calculated by multiplying by a factor for the particular destination row and dividing by the sum of the factors for all object relationships to destination rows. Internally, (similarly to the Even distribution strategy) this is represented by = SOURCE*SomeColumn/~(SomeColumn)

(iii) Simple Ratio: The value for each destination row from a particular source row may be calculated by multiplying by a factor and dividing by a different factor. Represented as =SOURCE*SomeColumn/AnotherColumn.

(iv) Internal weights & ratios: The value for each destination row from a particular source row may be calculated using a factor calculated by looking at other parts of the model (e.g., other objects). Represented using functions such as LookupObjectTotalValue(modelName, objectName) and LookupObjectUnitValue(modelName,objectName,matchCriteria). In one non-limiting example, to weight a distribution the same way that another object is weighted, an internal representation may be written: =SOURCE*LookupObjectUnitValue(Cost,Direct, Service=Service)/LookupObjectTotalValue(Cost,Direct). This can be read as "multiply the source value by the Cost of this Service in the Direct object and divide by the total Cost of the Direct object". This capability may require the calculation order to be orchestrated in such a way that other values (e.g., in the Direct object) are calculated before attempting to apply this rule.

One consideration in this algorithm according with an implementation is how to handle circularity relationships (e.g., "A" directly depends upon "B" but "B" depends (directly or indirectly) upon "A"). Resolving circularity relationships is described in more detail above in conjunction with block 406 of FIG. 4.

(v) Arbitrary modifications: An arbitrary formula may be used to determine a distribution. This can combine multiple of the above strategies or employ additional custom functions. For example, a weight factor could be calculated using logic—one could weight within a range, such as =SOURCE*PercentFromWeight(IF(HostCount<10, 5,20)). This can be read as "Services with a HostCount >=10 should be weighted 4× higher than services with a HostCount <10."

Figure 15:
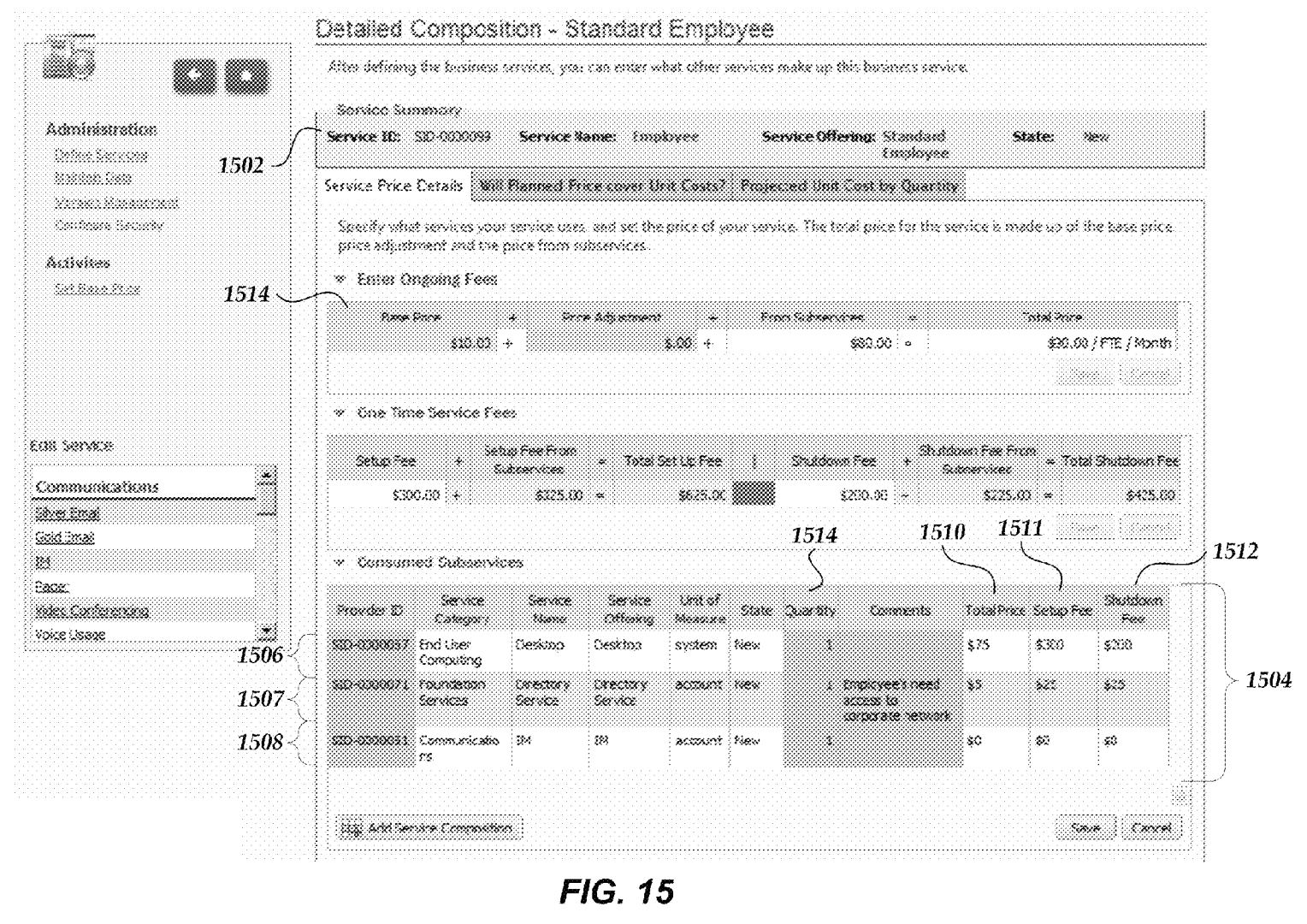

FIG. 15 shows one embodiment of a use case screenshot of a portion of a GUI that facilitates the definition of a propagation rule. Table 1504 identifies objects from which object 1502 depends (i.e. object 1502 consumes objects 1506-1508). Table 1504 may also include direct values 1510-1512 and quantity 1514 associated with object relationships between object 1502 and objects 1506-1508. Object 1502 may also include a base value 1514. In some embodiments, each of objects 1506-1508 may be an object for purposes of defining one or more propagation rules. In some embodiments, objects 1506-1508 may include one or more propagation rules (not shown) that utilize various allocation models to map one or more objects based on weights, ratios, cost, size, capacity, specific objects, object limitations, or the like. For example, in one implementation, costs from specific objects satisfying certain criteria (e.g., geographic, number of servers, cost centers, etc.) may be rolled up to object 1502.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method operating on one or more network devices that include at least one processor and a memory, where each step of the method is performed by the at least one processor, comprising:

generating a plurality of propagation rules that generate and define a plurality of object relationships between a plurality of objects and that generate and assign a plurality of direct values to the plurality of object relationships;

receiving the plurality of object relationships for the plurality of objects, wherein each object relationship defines a dependency between a consumer object and a provider object such that the consumer object is directly dependent on the provider object, and wherein each object relationship includes the plurality of direct values that are each associated and allocated with different values of the provider object consumed by the consumer object such that a subset of the plurality of direct values are at least one of related to or dependent on each other;

dynamically generating a hierarchical structure of dependent object relationships ("HSDOR") from the plurality of object relationships dependencies based on the plurality of propagation rules and one or more direct or indirect paths between a destination object and a source object;

utilizing the HSDOR to iteratively determine a total value for one or more of the plurality of objects as a function of a total loaded value of object relationships from which a respective object depends by combining a total loaded value of object relationships that share the respective object as the consumer object, wherein the total loaded value of a given object relationship is based at least in part on a combination of a direct value and the total value of the provider object of the given object relationship, and wherein the total loaded value of the given object relationship is iteratively determined by combining a quantity provided by the provider object of the given object relationship to a consumer object of the given object relationship with a direct value of the given object relationship and the total value of the provider object of the given object relationship;

determining a total quantity of units of objects consumed by each destination object/source object pair within the HSDOR based on a combination of each separate quantity of units of objects consumed along each separate direct path and indirect path between the destination object and the source object, wherein the source object of a destination object/source object pair is at least one of directly or indirectly dependent on the destination object; and storing the total quantity of units of objects consumed by each destination object/source object pair within the HSDOR in the memory.

2. The method of claim 1, further comprising:

modifying the HSDOR by resolving any detected circularity relationships within the HSDOR, wherein a circularity relationship includes a first consumer object that directly depends on a first provider object such that the first provider object also directly or indirectly depends on the first consumer object.

3. The method of claim 1, further comprising:
receiving a new object relationship between a first object and a second object, wherein at least the first object is one of the plurality of objects; and
updating, automatically and iteratively, the total loaded value of each object relationship that depends on the new object relationship.

4. The method of claim 2, wherein resolving the detected circularity relationships includes:
ignoring a direct value associated with the detected circularity relationship.

5. The method of claim 1, further comprising:
receiving at least one new or modified object relationship;
identifying one or more object relationships affected by the at least one new or modified object relationship; and
dynamically modifying the HSDOR based on the one or more affected object relationships independent of unaffected object relationships.

6. The method of claim 1, wherein one or more object relationships include a bidirectional object relationship such that a first object is a consumer of a first direct value from a second object and the second object is a consumer of a second direct value from the first object.

7. The method of claim 1, further comprising:
generating an object hierarchy transform for the HSDOR by determining the total quantity of each destination/source pair within the HSDOR.

8. A network device, comprising:
a transceiver for communicating with at least one client device over a network;
a memory that stores at least instructions; and
a processor that executes the instructions to perform actions, the actions comprising:
generating a plurality of propagation rules that generate and define a plurality of object relationships between a plurality of objects and that generate and assign a plurality of direct values to the plurality of object relationships;
receiving the plurality of object relationships for the plurality of objects, wherein each object relationship defines a dependency between a consumer object and a provider object such that the consumer object is directly dependent on the provider object, and wherein each object relationship includes a plurality of direct values that are each associated and allocated with different values of the provider object consumed by the consumer object such that a subset of the plurality of direct values are at least one of related to or dependent on each other;
dynamically generating a hierarchical structure of dependent object relationships ("HSDOR") from the plurality of object relationships dependencies based on the plurality of propagation rules and one or more direct or indirect paths between a destination object and a source object;
utilizing the HSDOR to iteratively determine a total value for one or more of the plurality of objects as a function of a total loaded value of object relationships from which a respective object depends by combining a total loaded value of object relationships that share the respective object as the consumer object, wherein the total loaded value of a given object relationship is based at least in part on a combination of a direct value and the total value of the provider object of the given object relationship, and wherein the total loaded value of the given object relationship is iteratively determined by combining a quantity provided by the provider object of the given object relationship to a consumer object of the given object relationship with a direct value of the given object relationship and the total value of the provider object of the given object relationship;
determining a total quantity of units of objects consumed by each destination object/source object pair within the HSDOR based on a combination of each separate quantity of units of objects consumed along each separate direct and indirect path between the destination object and the source object, wherein the source object of a destination object/source object pair is at least one of directly or indirectly dependent on the destination object; and
storing the total quantity of units of object consumed by each destination object/source object pair within the HSDOR in the memory.

9. The network device of claim 8, further comprising:
modifying the HSDOR by resolving any detected circularity relationships within the HSDOR, wherein a circularity relationship includes a first consumer object that directly depends on a first provider object such that the first provider object also directly or indirectly depends on the first consumer object.

10. The network device of claim 8, wherein the processor further enables actions, the actions comprising:
receiving a new object relationship between a first object and a second object, wherein at least the first object is one of the plurality of objects; and
updating, automatically and iteratively, the total loaded value of each object relationship that depends on the new object relationship.

11. The network device of claim 9, wherein resolving the detected circularity relationships includes:
ignoring a direct value associated with the detected circularity relationship.

12. A non-transitory processor readable storage device that includes instructions, which are arranged to be executed by a processor to perform actions, the actions comprising:
generating a plurality of propagation rules that generate and define a plurality of object relationships between a plurality of objects and that generate and assign a plurality of direct values to the plurality of object relationships;
receiving the plurality of object relationships for the plurality of objects, wherein each object relationship defines a dependency between a consumer object and a provider object such that the consumer object is directly dependent on the provider object, and wherein each object relationship includes a plurality of direct values that are each associated and allocated with different values of the provider object consumed by the consumer object such that a subset of the plurality of direct values of a respective object relationship are at least one of related to or dependent on each other;
dynamically generating a hierarchical structure of dependent object relationships ("HSDOR") from the plurality of object relationships dependencies based on the plurality of propagation rules and one or more direct or indirect paths between a destination object and a source object;
utilizing the HSDOR to iteratively determine a total value for one or more of the plurality of objects as a function of a total loaded value of object relationships from which a respective object depends by combining a total loaded value of object relationships that share respective object as the consumer object, wherein the total loaded value of a given object relationship is based at least in part on a combination of a direct value and the total value of the provider object of the given object relationship, and wherein the total loaded value of the given object relationship is iteratively determined by combining a quantity provided by the provider object of the given object relationship to a consumer object of the given object relationship with a direct value of the given object relationship and the total value of the provider object of the given object relationship;

determining a total quantity of units of objects consumed by each destination object/source object pair within the HSDOR based on a combination of each separate quantity of units of objects consumed along each separate direct path and indirect path between the destination object and the source object, wherein the source object of a destination object/source object pair is at least one of directly or indirectly dependent on the destination object; and storing the total quantity of units of objects consumed by each destination object/source object pair within the HSDOR in the storage device.

13. The non-transitory processor readable storage device of claim 12, further comprising:

modifying the HSDOR by resolving any detected circularity relationships within the HSDOR, wherein a circularity relationship includes a first consumer object that directly depends on a first provider object such that the first provider object also directly or indirectly depends on the first consumer object.

14. The non-transitory processor readable storage device of claim 12, wherein the processor to perform further actions, the actions comprising:

receiving a new object relationship between a first object and a second object, wherein at least the first object is one of the plurality of objects; and updating, automatically and iteratively, the total loaded value of each object relationship that depends on the new object relationship.

15. The processor readable storage device of claim 13, wherein resolving the detected circularity relationships includes:

ignoring a direct value associated with the detected circularity relationship.

16. The method of claim 1, wherein the plurality of direct values for an object relationship include a one-time direct value and a periodic direct value.

17. The method of claim 1, further comprising:

modifying the HSDOR by automatically resolving any detected circularity relationships within the HSDOR by dynamically modifying at least one of the plurality of propagation rules.

* * * * *